US012028280B2

(12) United States Patent
Jiang et al.

(10) Patent No.: US 12,028,280 B2
(45) Date of Patent: Jul. 2, 2024

(54) METHOD FOR INDICATING REFERENCE SIGNAL CONFIGURATION INFORMATION, BASE STATION, AND TERMINAL

(71) Applicant: ZTE Corporation, Guangdong (CN)

(72) Inventors: Chuangxin Jiang, Guangdong (CN); Nan Zhang, Guangdong (CN); Zhaohua Lu, Guangdong (CN); Yu Ngok Li, Guangdong (CN); Bo Gao, Guangdong (CN); Hao Wu, Guangdong (CN); Meng Mei, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/933,413

(22) Filed: Sep. 19, 2022

(65) Prior Publication Data

US 2023/0068244 A1 Mar. 2, 2023

Related U.S. Application Data

(63) Continuation of application No. 16/782,055, filed on Feb. 4, 2020, now Pat. No. 11,451,414, which is a (Continued)

(30) Foreign Application Priority Data

Aug. 9, 2017 (CN) ........................ 201710677499.3

(51) Int. Cl.
*H04W 72/04* (2023.01)
*H04B 7/0456* (2017.01)
(Continued)

(52) U.S. Cl.
CPC ......... *H04L 5/0023* (2013.01); *H04B 7/0456* (2013.01); *H04L 5/0048* (2013.01); (Continued)

(58) Field of Classification Search
CPC ........... H04W 72/042; H04W 72/0446; H04W 72/044; H04L 5/0023; H04L 5/0048; (Continued)

(56) References Cited

U.S. PATENT DOCUMENTS

| | | | |
|---|---|---|---|
| 10,686,572 | B2 | 6/2020 | Kundargi et al. |
| 2014/0348123 | A1 | 11/2014 | Zhou et al. |

(Continued)

FOREIGN PATENT DOCUMENTS

| | | |
|---|---|---|
| CN | 103220102 | 7/2013 |
| CN | 106549738 | 3/2017 |

(Continued)

OTHER PUBLICATIONS

Huawei et al., "Details of QCL assumptions and related RS design considerations," 3GPP TSG RAN WG1 Meeting #88, Athens, Greece, R1-1701697, 5 pages, Feb. 13-17, 2017.

(Continued)

*Primary Examiner* — Wei Zhao
(74) *Attorney, Agent, or Firm* — Perkins Coie LLP

(57) ABSTRACT

Provided are a method for indicating reference signal configuration information, a base station and a terminal. The method includes that a first communication node determines joint signaling and the first communication node transmits the joint signaling to a second communication node. The joint signaling includes first information and second information. The first information includes at least one of the following: quasi-colocation configuration information and configuration information of a transmission beam. The second information includes at least one of the following: configuration information of a phase tracking reference signal and configuration information of a demodulation reference signal.

16 Claims, 5 Drawing Sheets

Mobile terminal 10

Processor 102

Communication device 106

Memory 104

Related U.S. Application Data continuation of application No. PCT/CN2018/097244, filed on Jul. 26, 2018.

(51) Int. Cl.

| | |
|---|---|
| ***H04L 5/00*** | (2006.01) |
| ***H04L 5/10*** | (2006.01) |
| ***H04L 25/02*** | (2006.01) |
| ***H04L 27/26*** | (2006.01) |
| ***H04W 72/23*** | (2023.01) |
| ***H04W 72/232*** | (2023.01) |

(52) U.S. Cl.

CPC .............. *H04L 5/0051* (2013.01); *H04L 5/10* (2013.01); *H04L 25/0226* (2013.01); *H04L 27/2613* (2013.01); *H04W 72/23* (2023.01); *H04W 72/232* (2023.01); *H04L 27/26136* (2021.01)

(58) Field of Classification Search

CPC ..... H04L 5/0051; H04L 25/0226; H04L 5/10; H04L 27/26136; H04B 7/0456

See application file for complete search history.

(56) References Cited

U.S. PATENT DOCUMENTS

| | | | | |
|---|---|---|---|---|
| 2018/0205522 | A1 | 7/2018 | Wang et al. | |
| 2018/0205589 | A1* | 7/2018 | Bai | H04L 27/2646 |
| 2018/0331699 | A1* | 11/2018 | Lin | H04L 1/0072 |
| 2019/0044593 | A1* | 2/2019 | John Wilson | H04W 72/542 |
| 2020/0100327 | A1 | 3/2020 | Zhang et al. | |
| 2020/0177416 | A1 | 6/2020 | Jiang et al. | |
| 2020/0220675 | A1 | 7/2020 | Lee et al. | |
| 2021/0135922 | A1 | 5/2021 | Gao et al. | |

FOREIGN PATENT DOCUMENTS

| | | |
|---|---|---|
| CN | 108111272 | 6/2018 |
| WO | 2018182248 A1 | 10/2018 |
| WO | 2019020050 A1 | 1/2019 |

OTHER PUBLICATIONS

International Search Report and Written Opinion for International Application No. PCT/CN2018/097244, dated Oct. 24, 2018. 14 pagers with unofficial English translation.

National Instruments, "Discussion on explicit and implicit signaling for PT-RS," 3GPP TSG RAN WG1 Meeting #89, Hangzhou, China, R1-1708272, 11 pages, May 15-19, 2017.

Sony, "Open issues on SRS design," 3GPP TSG RAN WG1 NR Ad-Hoc #2, Qingdao, China, R1-1711951, 28 pages, Jun. 27-30, 2017.

Samsung, "Discussion on transmission parameter sets," 3GPP TSG RAN WG1 NR Ad-Hoc #2, Qingdao, China, R1-1710650, 3 pages, Jun. 27-30, 2017.

Interdigital, Inc., "On SRS for NR," 3GPP TSG RAN WG1 Meeting #89, Hangzhou, China, R1-1708343, 3 pages, May 15-19, 2017.

Samsung, "On DL PT-RS design," 3GPP TSG RAN WG1 NR Ad-hoc #2, Qingdao, China, R1-1710686, 5 pages, Jun. 27-30, 2017.

Mediatek Inc., "SRS design in NR," 3GPP TSG RAN WG1 NR Ad-Hoc #2, Qingdao, China, R1-1710817, 6 pages, Jun. 27-30, 2017.

ETSI, "5G; Study on new radio access technology," 3GPP TR 38.912 version 14.1.0 Release 14, Oct. 2017. 78 pages.

USPTO, File history of U.S. Appl. No. 62/480,004, filed Mar. 31, 2017, 166 pages.

IMPI, Office Action for Mexican Application No. MX/a/2020/001552, dated Mar. 28, 2023, 9 pages with unofficial translation.

EPO, Communication pursuant to Article 94(3) EPC for European Application No. 18842967.4, dated Apr. 26, 2023, 6 pages.

KIPO, Office Action for Korean Application No. 10-2022-7012800, dated Apr. 28, 2023, 9 pages with unofficial translation.

JPO, Decision on Patent for Japanese Application No. 2020-507084, dated May 9, 2023, 2 pages.

Summary of IPTAB decision dated Oct. 25, 2022 for Korean Application No. 10-2020-7006688, 4 pages.

EPO, Communication pursuant to Article 94(3) EPC for European Application No. 18842967.4, dated Jul. 24, 2023, 8 pages.

Huawei et al., PTRS for CP-OFDM, 3GPP draft; R1-1706937, 3rd Generation Partnership Project (3GPP), Mobile Competence Centre; 650, Route Des Lucioles; F-06921 Sophia-Antipolis Cedex; France, vol. RAN WG1, No. China; May 15, 2017-May 19, 2017, May 14, 2017, http://www.3gpp.org/ftp/Meetings_3GPP_SYNC/RAN1/Docs/.

EPO, Extended European Search Report dated Nov. 14, 2023 for Application No. 23189525.1, 12 pages.

Republic of Korea, Korean Final Rejection dated Nov. 22, 2023 for Application No. 10-2022-7012800 with summary, 6 pages.

Mexico, Notice of Allowance for Application No. MX/a/2020/001552 dated Dec. 1, 2023, 3 pages.

USPTO, Non-Final Office Action for U.S. Appl. No. 18/192,470, mailed on Feb. 29, 2024, 12 pages.

Kipo, Final Rejection for Korean Application No. 10-2022-7012800, mailed on Apr. 4, 2024, 6 pages with unofficial translation.

* cited by examiner

METHOD FOR INDICATING REFERENCE SIGNAL CONFIGURATION INFORMATION, BASE STATION, AND TERMINAL

CROSS-REFERENCE TO RELATED APPLICATIONS

The present application is a continuation of U.S. patent application Ser. No. 16/782,055 filed on Feb. 4, 2020, which is a continuation of International Application No. PCT/CN2018/097244 filed on Jul. 26, 2018, which is based on and claims priority to a Chinese patent application No. 201710677499.3 filed on Aug. 9, 2017, the disclosures of which are incorporated herein by reference in their entireties.

TECHNICAL FIELD

The present application relates to, but is not limited to, the field of communications and, in particular, relates to a method for indicating reference signal configuration information, a base station and a terminal.

BACKGROUND

In the related art, it is necessary to introduce a phase noise tracking reference signal (PTRS) to estimate phase noises at high frequencies. Generally, one antenna panel of one transmission receiver point (TRP) uses one crystal oscillator, so multiple Demodulation reference signals (DMRS) ports from the one antenna panel may share one PTRS port, that is, estimation results of the PTRS port may be used for the multiple DMRS ports from the one antenna panel. If multiple panels of one TRP share one crystal oscillator, then all DMRS ports from the one TRP may share one PTRS port. However, at present, there is no consensus on how to know the number of the PTRS ports and how to notify the user of the number of PTRS ports. Semi-static notification of the number of PTRS ports is not flexible, while flexible notification of Downlink Control Information (DCI) requires the physical layer signaling overhead. In addition, there is also no consensus on how to configure the type and the symbol quantity of the front loaded reference signal. The semi-static configuration of the high layer signaling will have problems in multi-cell transmission, while the flexible notification of DCI requires the physical layer signaling overhead.

At present, a New Radio (NR) physical layer technology is under a heated discussion in the Radio Access Network (RAN) 1 of the 3rd Generation Partnership Project (3GPP). Flexibility and efficiency have always been the goal pursued by the NR physical layer design. Also, pursuing for the maximum flexibility of a physical layer reference signal also seems to be a trend. This is because requirements for demodulating reference signals may be different for different application scenarios. In addition, the NR supports to transmit data at high frequencies, so a multi-antenna beamforming technology is necessary for compensating a huge path loss and other losses at high frequencies, such as the attenuation caused by rain or plant absorption. The beamforming technology at high frequencies may be divided into a digital beamforming, an analogue beamforming and a hybrid digital-and-analogue beamforming. In the digital beamforming technology, the transmitting end needs to know relatively well about the channel state, that is, know channel information of each antenna port, so huge reference signal overhead becomes a problem. Therefore the analogue beamforming has received wide attention. The beamforming method may be implemented on a transmitting end, and may also be implemented on a receiving end. For example, the base station may transmit data to the user by using different transmission beams and the user may also receive the data by using different receiving beams.

In a Long Term Evolution (LTE), a Quasi-colocation (QCL) parameter set mainly includes an average gain, a delay spread, a Doppler spread, a Doppler shift and an average delay. When performing a multi-TRP transmission, the base station needs to notify the user of a reference signal quasi co-located with the DMRS of the user and PDSCH mapping parameters. In this way, the user may demodulate the data by using QCL parameter information of a configured reference signal.

However, in the related art, notifying the user of the reference signal information causes additional physical layer overhead, thereby causing the problem of huge signaling and physical layer overhead.

SUMMARY

Embodiments of the present application provide a method for indicating reference signal configuration information, a base station and a terminal.

The method for indicating reference signal information provided by an embodiment of the present application includes: determining joint signaling, and transmitting the joint signaling. The joint signaling is used for indicating the reference signal configuration information. The joint signaling includes first information and second information. The first information includes at least one of: quasi-colocation configuration information and configuration information of a transmission beam. The second information includes at least one of: configuration information of a phase tracking reference signal and configuration information of a demodulation reference signal.

A method for indicating reference signal information provided by another embodiment of the present application includes: receiving joint signaling, and performing, according to the joint signaling, data transmission with a communication node transmitting the joint signaling. The joint signaling includes first information and second information. The first information includes at least one of: quasi-colocation configuration information and configuration information of a transmission beam; the second information includes at least one of the following: configuration information of a phase tracking reference signal and configuration information of a demodulation reference signal. The joint signaling is used for indicating reference signal configuration information.

A base station is provided by another embodiment of the present application, and the base station includes: a first processor, which is configured to determine joint signaling, where the joint signaling includes first information and second information, the first information includes at least one of: quasi-colocation configuration information and configuration information of a transmission beam, the second information includes at least one of: configuration information of a phase tracking reference signal and configuration information of a demodulation reference signal; and a first communication device, which is used for transmitting the joint signaling to a second communication node.

A terminal is provided by another embodiment of the present application, and the terminal includes: a second communication device, which is configured to receive joint signaling transmitted by a first communication, where the joint signaling includes first information and second information, the first information includes at least one of: quasi-colocation configuration information and configuration information of a transmission beam, and the second information includes at least one of: configuration information of a phase tracking reference signal and configuration information of a demodulation reference signal; and a second processor, which is configured to receive, according to the joint signaling, data transmitted by a first communication node, and/or perform data transmission with the first communication node.

A device for indicating reference signal information is provided by another embodiment of the present application. The device is applied to a first communication node and includes: a determining module, which is configured to determine joint signaling, where the joint signaling includes first information and second information, the first information includes at least one of: quasi-colocation configuration information and configuration information of a transmission beam, and the second information includes at least one of: configuration information of a phase tracking reference signal and configuration information of a demodulation reference signal; and a transmitting module, which is configured to transmit the joint signaling to a second communication node.

A device for indicating reference signal information is provided by another embodiment of the present application. The device is applied to a second communication node and includes a receiving module, which is configured to receive joint signaling transmitted by a first communication, where the joint signaling includes first information and second information, the first information includes at least one of: quasi-colocation configuration information and configuration information of a transmission beam, and the second information includes at least one of: configuration information of a phase tracking reference signal and configuration information of a demodulation reference signal; and a transmission module, which is configured to receive, according to the joint signaling, data transmitted by a first communication node, and/or perform data transmission with the first communication node.

A storage medium is provided by another embodiment of the present application. The storage medium includes programs stored therein. When executed, the programs execute the method of any one of the embodiments described above.

A processor is provided by another embodiment of the present application. The processor is used for executing programs. When executed, the programs execute the method of any one of the embodiments described above.

In this application, a first communication node determines joint signaling, where the joint signaling includes first information and second information; where the first information includes at least one of: quasi-colocation configuration information and configuration information of a transmission beam, and the second information includes at least one of: configuration information of a phase tracking reference signal and configuration information of a demodulation reference signal; and the first communication node transmits the joint signaling to a second communication node. With the above technical solutions, the joint signaling solves the problem of huge physical layer overhead and signaling overhead caused by notifying the user of reference signal information in the related art. In a case of guaranteeing that the user terminal is accurately notified of the reference signal information, the joint signaling reduces the physical layer overhead and signaling overhead.

BRIEF DESCRIPTION OF DRAWINGS

The drawings described herein are used to provide a further understanding of the present application and form a part of the present application. The exemplary embodiments and descriptions thereof in the present application are used to explain the present application and not to limit the present application in any improper way. In the drawings:

FIG. 6 is a schematic diagram 1 of a demodulation reference signal type 1 according to the example 1a;

FIG. 7 is a schematic diagram 2 of a demodulation reference signal type 1 according to the example 1a;

DETAILED DESCRIPTION

An embodiment of the present application provides a mobile communication network (which includes, but is not limited to a 5G mobile communication network). The network architecture of this network may include a network-side device (such as a base station) and a terminal. An information transmission method executed on the network architecture is provided by the embodiment. It should be noted that the execution environment of the information transmission method provided by the embodiment of the present application is not limited to the above network architecture. It should be noted that in this present application, a first communication node may be the network-side device, such as the base station and a second communication node may be the terminal. Other cases are not excluded of course, for example, the first communication node generally refers to a user and the second communication node also generally refers to the user, and the method may be applied to a Device to Device (D2D) communication.

Figure 1:
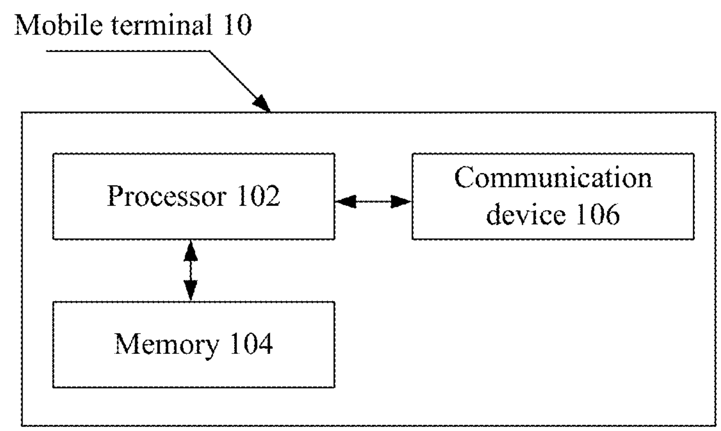
FIG. 1 is a block diagram illustrating the hardware construction of a mobile terminal of a method for indicating reference signal information according to an embodiment of the present application.

A method embodiment provided by one embodiment of the present application may be executed in a mobile terminal, a computer terminal or other similar computing devices. The description below takes the method executed on the mobile terminal as an example. FIG. 1 is a block diagram illustrating the hardware construction of a mobile terminal of a method for indicating reference signal information according to an embodiment of the present application. As shown in FIG. 1, the mobile terminal 10 may include one or more (only one is shown in FIG. 1) processors 102 (the processor 102 may include, but is not limited to, a microprocessor (MCU), a programmable logic device such as FPGA or other processing devices), a memory 104 configured to store data, and a communication device 106 for implementing a communication function. It will be understood by those skilled in the art that the structure shown in FIG. 1 is merely illustrative, and not intended to limit the structure of the electronic device described above. For example, the mobile terminal 10 may further include more or fewer components than that shown in FIG. 1 or may have a configuration different from the configuration shown in FIG. 1.

The memory 104 may be configured to store software programs and modules of application software, such as program instructions/modules corresponding to the method for indicating the reference signal information in the embodiment of the present application. The processors 102 execute the software programs and modules stored in the memory 104 to perform various functional applications and data processing, that is, to implement the method described above. The memory 104 may include a high-speed random access memory, and may further include a nonvolatile memory, such as one or more magnetic storage devices, flash memories or other nonvolatile solid-state memories. In some examples, the memory 104 may further include memories that are remotely disposed with respect to the processors 102. These remote memories may be connected to the mobile terminal 10 via a network. Examples of such a network include, but are not limited to, the Internet, intranets, local area networks, mobile communication networks, and combinations thereof.

The communication device 106 is configured to receive or transmit data via a network. Specific examples of such a network described above may include a wireless network provided by a communication provider of the mobile terminal 10. In one example, the communication device 106 includes a Network Interface Controller (NIC), which may be connected to other network devices via a base station and thus be capable of communicating with the Internet. In one example, the communication 106 may be a Radio Frequency (RF) module, which is used for communicating with the Internet in a wireless way.

In the Long Term Evolution (LTE), the base station configures, through higher layer signaling, a PQI (data channel mapping and QCL indication information) to be similar to an information configuration in table 7.1.9-1 of LTE standard 36.213. As described in the standard 36.213, generally, the base station configures, by higher signaling, multiple sets of parameters (such as four sets) for indicating a Physical Downlink Shared Channel (PDSCH) RE Mapping and Quasi-Co-Location Indicator. In standard 36.212, as described in DCI format 2D, the base station indicates which is configured by higher layer signaling by using several bits signaling, such as 2 bits. If it is a dynamical point selection (DPS) scheduling, the multiple sets of PQI parameters may correspond to different TRP transmissions.

Since effects of data demodulation with different receiving beams at high frequencies are different, the base station needs to indicate the user the receiving beam used for receiving data. Or the base station indicates, by using a QCL parameter, the user that a certain reference signal transmitted before is used for receiving a beam indication, that is, the user uses the receiving beam of the reference signal indicated by the base station to receive when receiving the data or the DMRS. Since this reference signal has been transmitted before, and usually transmitted cyclically for a beam management, the user has already been known the best receiving beam used by receiving this reference signal.

So, in the NR, a parameter, namely spatial Rx parameters, used for receiving the beam indication is added in the QCL parameter set. So, the QCL parameter set in the NR includes an average gain, a delay spread, a Doppler spread, a Doppler shift, an average delay and spatial Rx parameters. The spatial Rx parameters may include one or more reference signals.

Similar to the LTE, the NR also supports the multi-TRP transmission, that is, a coordinated multiple points Transmission/Reception (CoMP). The CoMP technology includes multiple transmission schemes, such as a dynamical point selection (DPS) and a joint transmission (JT). Since different TRPs or transmission beams may have totally different or partially different QCL parameters, when performing the JT, if different DMRS ports from different TRPs, the QCL parameters of these DMRS ports may be different.

Figure 2:
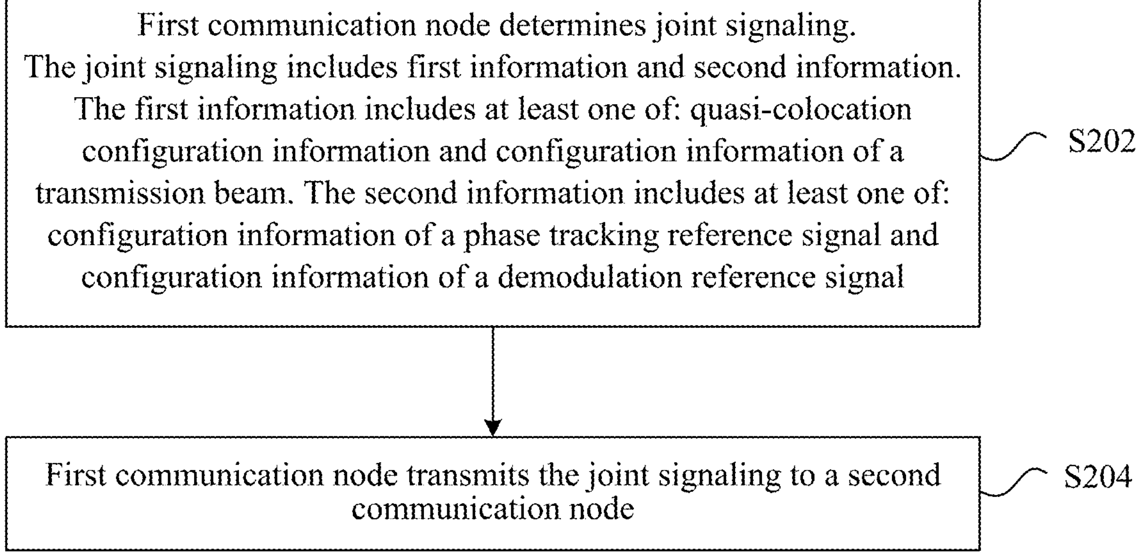
FIG. 2 is a flowchart of a method for indicating reference signal information according to an embodiment of the present application.

In addition, a phase noise tracking RS (PTRS) may be necessary to estimate phase noises at high frequencies. This is because at high frequencies, the phase noises greatly reduce of the estimation accuracy of the demodulation reference signal on a time domain, thereby reducing the system transmission efficiency. Generally, since one antenna panel of one TRP uses one oscillator, then multiple DMRS ports of the one antenna panel may share one PTRS port, that is, the PTRS port estimation result may be used for the multiple DMRS ports of the one antenna panel. If multiple panels of one TRP share one oscillator, then all DMRS ports of the one TRP may share one PTRS port. A user device is notified of the shared PTRS port of the DMRS ports, which may reduce the signaling overhead and physical layer resource overhead as much as possible. In view of this, this embodiment provides a method for indicating the reference signal information executed on the network architecture described above. FIG. 2 is a flowchart of a method for indicating reference signal information according to an embodiment of the present application. As shown in FIG. 2, the process includes steps described below.

In step S202, the first communication node determines joint signaling. The joint signaling includes first information and second information. The first information includes at least one of: quasi-colocation configuration information and configuration information of a transmission beam. The second information includes at least one of: configuration information of a phase tracking reference signal and configuration information of a demodulation reference signal.

In step S204, the first communication node transmits the joint signaling to the second communication node.

In the steps described above, the first communication node determines the joint signaling. The joint signaling includes the first information and the second information. The first information includes at least one of: the quasi-colocation configuration information and the transmission beam configuration information. The second information includes at least one of: the configuration information of the phase tracking reference signal and the configuration information of the demodulation reference signal. The first communication node transmits the joint signaling to the second communication node. With the above technical solutions, the joint signaling solves the problem of additional physical layer overhead caused by notifying the user of the reference signal information in the related art. While guaranteeing that the user terminal is accurately notified of the reference signal information, the joint signaling reduces the physical layer overhead.

In some embodiments, the above steps may, but are not limited to, be executed by the base station.

In some embodiments, the configuration information of the demodulation reference signal includes at least one of: a number of symbols of the demodulation reference signal, a type of the demodulation reference signal, a code division type of the demodulation reference signal, an order of the demodulation reference signal ports, and port mapping information of the demodulation reference signal.

In some embodiments, the quasi-colocation configuration information includes one or more quasi-colocation parameter subsets, the demodulation reference signal ports includes one or more type 1 port groups of the demodulation reference signal, where each of the one or more quasi-colocation parameter subsets corresponds to a respective one of the one or more type 1 port groups of the demodulation reference signal.

In some embodiments, the first communication node also configures, through higher layer signaling, at least one of the following information for the second communication node: a maximum number of the quasi-colocation parameter subsets; and a maximum number of the type 1 port groups of the demodulation reference signal.

In some embodiments, the configuration information of the phase tracking reference signal includes at least one of: a number of phase tracking reference signal ports, one or more port identifiers of the phase tracking reference signal and a maximum number of phase tracking reference signal ports.

In some embodiments, in a case where the quasi-colocation configuration information includes one or more quasi-colocation parameter subsets, the first communication node transmits the joint signaling to the second communication node, the joint signaling includes the one or more quasi-colocation parameter subsets and one or more port identifiers of phase tracking reference signal, where each of the one or more quasi-colocation parameter subsets corresponds to a respective one of the phase tracking reference signal ports.

In some embodiments, the maximum number of phase tracking reference signal ports is equal to the maximum number of quasi-colocation parameter subsets.

In some embodiments, the first communication node indicates the following information through the joint signaling: whether the type 1 port groups of the demodulation reference signal share one phase tracking reference signal, or whether the port groups are quasi co-located regarding a part of the quasi-colocation parameters.

In some embodiments, in a case where two type 1 port groups of the demodulation reference signal are quasi co-located regarding the quasi-colocation parameters, the two type 1 port groups of the demodulation reference signal share one phase tracking reference signal. The part of quasi-colocation parameters comprises a Doppler spread and a Doppler shift.

In some embodiments, one phase tracking reference signal corresponds to one type 2 port group of the demodulation reference signal, wherein the type 2 port group of the demodulation reference signal includes one or more type 1 port groups of the demodulation reference signal.

In some embodiments, the first communication node determines a code division type of the demodulation reference signal according to the number of quasi-colocation parameter subsets. All demodulation reference signal ports in each code division group have same quasi-colocation parameters, and the quasi-colocation parameters of the demodulation reference signal ports in different code division groups are same or different. The DMRS ports included in a code division group of code division group type 1 have same codes used on a time domain and different codes used on a frequency domain. A code division group of code division group type 2 includes two code division groups of code division group type 1, and the demodulation reference signal ports included in the two code division groups of code division group type 1 occupy same time frequency resources, and have different time domain OCC codes.

In some embodiments, the first communication node and the second communication node agree that a plurality of information indicating states of the demodulation reference signal include same demodulation reference signal ports, and orders of demodulation reference signal ports indicated by the plurality of information indicating states are different.

In some embodiments, different orders of demodulation reference signal ports correspond to different quasi-colocation parameters.

In some embodiments, the first communication node determines that the second communication is provided with two quasi-colocation parameter sets and six DMRS ports, and the six DMRS ports are mapped on only one time domain symbol of the demodulation reference signal, all demodulation reference signal ports of the first communication node use a first quasi-colocation parameter set of the two quasi-colocation parameter sets and do not use a second quasi-colocation parameter set of the two quasi-colocation parameter sets.

In some embodiments, the first communication node indicates at least one of the following through the joint signaling: the configuration information of the transmission beam and the configuration information of the phase tracking reference signal.

In some embodiments, the configuration information of the transmission beam includes at least one of: information indicating a sounding reference signal resource and a precoding information indication. It should be noted that the information indicating the sounding reference signal resource includes an identifier for identifying the resource, that is, which resource of the sounding reference signal configured this time is identified by this identifier. The identifier of the resource information is similar to an index.

In some embodiments, the information indicating the sounding reference signal resource includes port information of the phase tracking reference signal.

In some embodiments, one or more resources of the sounding reference signal constitute a sounding reference signal resource set, each sounding reference signal resource set corresponds to same port information of the phase tracking reference signal.

In some embodiments, resource configuration information of the sounding reference signal configured by higher layer signaling includes port identifier of the phase tracking reference signal. The higher layer signaling here may include: radio resource control signaling or media access control signaling. The resource configuration information of the sounding reference signal carries the one or more port identifiers of phase tracking reference signal.

A method for indicating reference signal information is provided by another embodiment of the present application. The method is applied to a second communication node and includes the steps described below.

In step one, the second communication node receives joint signaling transmitted by a first communication node. The joint signaling includes first information and second information. The first information includes at least one of: quasi-colocation configuration information and configuration information of a transmission beam. The second information includes at least one of: configuration information of a phase tracking reference signal and configuration information of a demodulation reference signal.

In step two, the second communication node receives, according to the joint signaling, data transmitted by the first communication node, and/or performs data transmission with the first communication node.

In some embodiments, the configuration information of the demodulation reference signal includes at least one of: a number of symbols of the demodulation reference signal, a type of the demodulation reference signal, a code division type of the demodulation reference signal, an order of the demodulation reference signal ports, and port mapping information the demodulation reference signal.

In some embodiments, the quasi-colocation configuration information includes one or more quasi-colocation parameter subsets. The demodulation reference signal ports include one or more type 1 port groups of the demodulation reference signal. Each of the one or more quasi-colocation parameter subsets corresponds to a respective one of the one or more type 1 port groups of the demodulation reference signal.

In some embodiments, the second communication node receives at least one of the following information configured by the first communication node through higher layer signaling: a maximum number of the quasi-colocation parameter subsets; and a maximum number of the type 1 port groups of the demodulation reference signal.

In some embodiments, the configuration information of the phase tracking reference signal includes at least one of: a number of phase tracking reference signal ports, one or more port identifiers of the phase tracking reference signal and a maximum number of the phase tracking reference signal ports.

In some embodiments, in a case where the quasi-colocation configuration information includes one or more quasi-colocation parameter subsets, the second communication node receives the joint signaling transmitted by the first communication. The joint signaling includes the one or more quasi-colocation parameter subsets and one or more port identifiers of the phase tracking reference signal, where each of the one or more quasi-colocation parameter subsets corresponds to a respective one of the phase tracking reference signal ports.

In some embodiments, the maximum number of the phase tracking reference signal ports is equal to the maximum number of the quasi-colocation parameter subsets.

In some embodiments, the second communication node receives the following information notified by the joint signaling: whether the type 1 port groups of the demodulation reference signal share one phase tracking reference signal, or whether the port groups are quasi co-located regarding a part of the quasi-colocation parameters.

In some embodiments, in a case where two type 1 port groups of the demodulation reference signal are quasi co-located regarding the quasi-colocation parameters, the two type 1 port groups of the demodulation reference signal share one phase tracking reference signal; where the part of quasi-colocation parameters includes a Doppler spread and a Doppler shift.

In some embodiments, one phase tracking reference signal corresponds to one type 2 port group of the demodulation reference signal, where the type 2 port group of the demodulation reference signal includes one or more type 1 port groups of the demodulation reference signal.

In some embodiments, the code division type of the demodulation reference signal is determined by the first communication node according to the number of quasi-colocation parameter subsets. All demodulation reference signal ports in each code division group have same quasi-colocation parameters, and the quasi-colocation parameters of the demodulation reference signal ports in different code division groups are same or different. The DMRS ports included in a code division group of code division group type 1 have same codes used on a time domain and different codes used on a frequency domain. The code division group of code division group type 2 includes two code division groups of code division group type 1, and the demodulation reference signal ports included in the two code division groups of code division group type 1 occupy same time frequency resources and have different time domain OCC codes.

In some embodiments, the second communication node and the first communication node agree that a plurality of information indicating states of the configuration information of the demodulation reference signal comprise same demodulation reference signal ports, and orders of demodulation reference signal ports indicated by the plurality of information indicating states are different.

In some embodiments, different orders of demodulation reference signal ports correspond to different quasi-colocation parameters.

In some embodiments, in a case where the second communication node is provided with two quasi-colocation parameter sets and six DMRS ports, and the six DMRS ports are mapped on only one time domain symbol of the demodulation reference signal, all demodulation reference signal ports of the first communication node use a first quasi-colocation parameter set of the two quasi-colocation parameter sets and do not use a second quasi-colocation parameter set of the two quasi-colocation parameter sets.

In some embodiments, the second communication node receives at least one of the following information through the joint signaling: the configuration information of the transmission beam and the configuration information of the phase tracking reference signal.

In some embodiments, the configuration information of the transmission beam includes at least one of: information indicating a sounding reference signal resource and a precoding information indication.

In some embodiments, the information indicating the sounding reference signal resource includes port information of the phase tracking reference signal.

In some embodiments, one or more resources of the sounding reference signal constitute a sounding reference signal resource set, each sounding reference signal resource set corresponds to same port information of the phase tracking reference signal.

The present application will be described below in detail in conjunction with examples.

EXAMPLE OF THE DMRS TYPE 2

At present, for the design of the reference signal, a DMRS pattern based on a Frequency domain orthogonal covering code (FD-OCC) is called the DMRS type 2. The DMRS type 2 may effectively support up to six ports in one DMRS symbol (as shown in FIG. 3) and support up to twelve ports in two DMRS symbols (as shown in FIG. 4).

Figure 3:
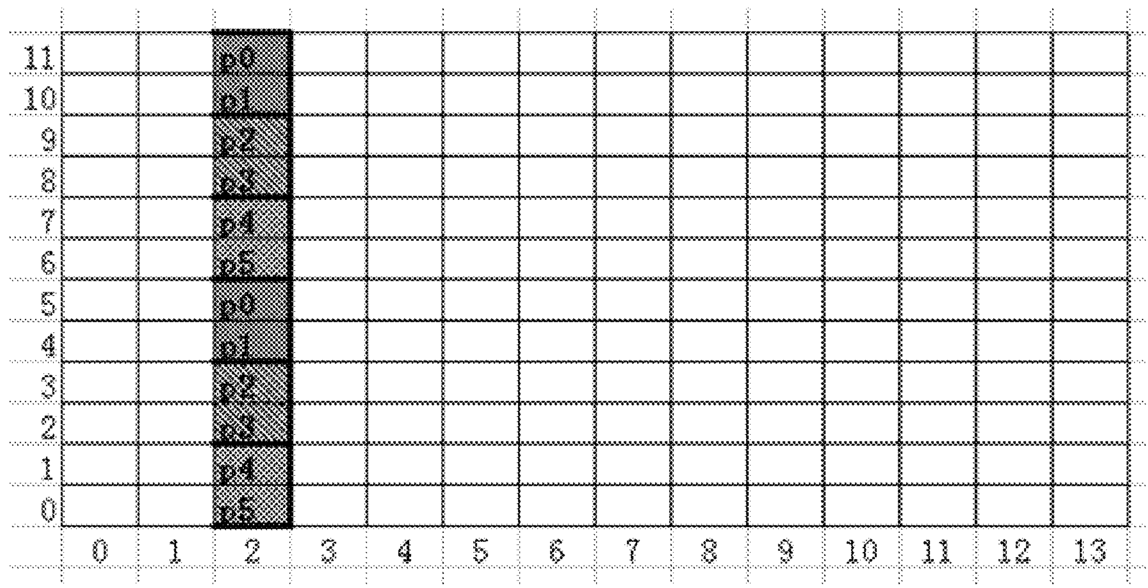
FIG. 3 is a schematic diagram 1 of a demodulation reference signal type 2 according to the example 1.
Figure 4:
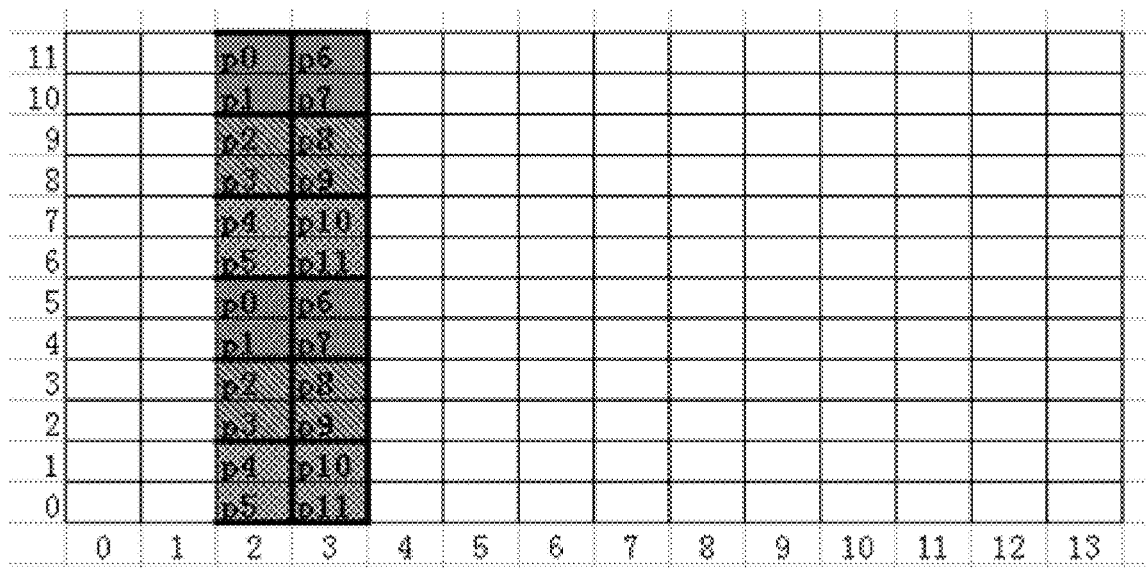
FIG. 4 is a schematic diagram 2 of a demodulation reference signal type 2 according to the example 1.

FIG. 3 is a schematic diagram 1 of the demodulation reference signal type 2 according to the above embodiment. As shown in FIG. 3, in one Resource block (RB), the abscissa is the time domain, and the ordinate is the frequency domain. Six DMRS ports are divided into three code division multiplexing (CDM) groups. A CDM group #0 includes a port p0 and a port p1. In the CDM group #0, the port p0 and the port p1 are mapped onto the same time frequency resources through the OCC division. For example, the OCC used by the port p0 is [1 1], the OCC used by the port p1 is [1 −1]. In one RB, subcarriers mapped by the ports p0 and p1 include subcarriers #4, #5, #10 and #11. Similarly, a CDM group #1 includes a port p2 and a port p3. In the CDM group #1, the port p2 and the port p3 are mapped onto the same time frequency resources through the OCC division. For example, the OCC used by the port p2 is [1 1], and the OCC used by the port p3 is [1 −1]. A CDM group #2 includes a port p4 and a port p5. In the CDM group #2, the port p4 and the port p5 are mapped onto the same time frequency resources through the OCC division. For example, the OCC used by the port p4 is [1 1], and the OCC used by the port p5 is [1 −1]. The six DMRS ports may be allocated to one user, that is, a single-user MIMO (SU-MIMO), and may also be allocated to multiple users, that is, a multi-user MIMO (MU-MIMO). The pattern in the figure may support up to six DMRS ports, but the base station does not necessarily allocate the 6 DMRS ports to the users when actually scheduling the users. For example, when a cell has a few users and the number of ports required by the users is small, the base station only needs one or two ports. The ports here may be logic ports, and transmitting one or two ports may be transmitting signals corresponding to the one or two ports, such as DMRSs.

A DMRS port group or a DMRS group, ports in which are quasi co-located regarding all quasi-colocation parameters, may be called a type 1 port group of the DMRS. It should be noted that the type 1 port group of the DMRS is a type 1 port group, and the type 1 port group may be used for transmitting the DMRSs, and thus is called DMRS type port group. The DMRSs transmitted by the type 1 port group of the DMRS may be the DMRS type 1 and/or the DMRS type 2. The DMRS type 1 and the DMRS type 2 both are DMRS types, but are different DMRS types. The DMRS types and the port group types have no specific relationship.

For performing a code division demodulation easier, two DMRS ports in the same CDM group have same parameters. In this way, when performing an intercode demodulation, the QCL of an interference port is the same with the QCL of a target demodulation port, which is beneficial to an accurate demodulation.

FIG. 4 is a schematic diagram 2 of the demodulation reference signal type 2 according to example one. As shown in FIG. 4, when the demodulation reference signal has two DMRS symbols, up to twelve DMRS ports may be supported. The twelve DMRS ports may be divided into three CDM groups. A CDM group #0 includes a port p0, a port p1, a port p6 and a port p7. A CDM group #1 includes a port p2, a port p3, a port p8 and a port p9. A CDM group #2 includes a port p4, a port p5, a port p10 and a port p11. In the CDM group #0, the port p0, the port p1, the port p6 and the port p7 occupy the same time frequency resources, but the time domain OCCs or the frequency domain OCCs used are different. For example, the port p0 and the port p1 are distinguished by their frequency domain OCCs, but their time domain OCCs are the same, that is, the frequency domain OCC used by the port p0 is [1 1], the frequency domain OCC used by the port p1 is [1 −1], but the port p0 and the port p1 use the same time domain OCC [1 1]. The p6 and the p7 are distinguished by the frequency domain OCCs, but their time domain OCCs are the same, that is, the frequency domain OCC used by the port p6 is [1 1], the frequency domain OCC used by the port p7 is [1 −1], but the port p6 and the port p7 use the same time domain OCC [1 −1]. Similarly, four ports in each other CDM group are configured in the same manner. In CDM group #1, the port p2 and the port p3 use different frequency domain OCCs but same time domain OCC. The port p8 and the port p9 use different frequency domain OCCs but same time domain OCC. The time domain OCC used by the port p2 and the port p3 is different from the time domain OCC used by the port p8 and the port p9. In CDM group #2, the port p4 and the port p5 use different frequency domain OCCs but same time domain OCC. The port p10 and the port p11 use different frequency domain OCCs but same time domain OCC. But the time domain OCC used by the port p4 and the port p5 is different from the time domain OCC used by the port p10 and the port p11. This type of a CDM group is referred to as a CDM group type 2, that is, a code division group type 2.

For performing the code division demodulation easier, four DMRS ports in the same CDM group may be configured to have same QCL parameters in a predefined manner. But the number of the CDM groups is limited up to three.

In the present application, the ports p0-p11 are integers, and not necessarily are continuous integers. For example, the ports p0-p11 actually may represent ports 1000-1011.

Generally, at high frequencies, a NR base station may be provided with multiple antenna panels. Each panel may transmit different analog beams which correspond to different demodulation reference signal ports. Of course, one panel may also transmit one analog beam which corresponds multiple digital beams. These digital beams correspond to different DMRS ports. Since different beams transmitted by the multiple panels correspond to multiple DMRS ports, QCLs to which the multiple ports correspond may be same or different.

In the multi-TRP transmission, and when each TRP has multiple panels, if the number of CDM groups is limited to three, then the number of the DMRS groups is limited to three, that is, up to three beam transmissions with different QCL are supported, which may limit the scheduling.

For the pattern with two DMRS symbols, as shown in FIG. 4, optionally, twelve DMRS ports may be divided into six CDM groups. A CDM group #0 includes ports p0 and p1, and the port p0 and port p1 are distinguished by different frequency domain OCCs. For example, the frequency domain OCC used by the port p0 is [1 1], the frequency domain OCC used by the port p1 is [1 −1]. A CDM group #1 includes ports p2 and p3, and the port p2 and port p3 are distinguished by different frequency domain OCCs. A CDM group #2 includes ports p4 and p5, and the port p4 and port p5 are distinguished by different frequency domain OCCs. A CDM group #3 includes ports p6 and p7, and the port p6 and port p7 are distinguished by different frequency domain OCCs. A CDM group #4 includes ports p8 and p9, and the port p8 and port p9 are distinguished by different frequency domain OCCs. A CDM group #5 includes ports p10 and p11, and the port p10 and port p11 are distinguished by different frequency domain OCCs. Meanwhile, the ports in the CDM group #0 and the ports in the CDM group #3 occupy the same time frequency resources, but use different time domain OCCs. For example, the time domain OCC used by the ports p0 and p1 in the CDM group #0 is [1 1], while the time domain OCC used by the ports p6 and p7 in the CDM group #3 is [1 −1]. The ports in the CDM group #1 and the ports in the CDM group #4 occupy the same time frequency resources, but use different time domain OCCs. For example, the time domain OCC used by the ports p2 and p3 in the CDM group #1 is [1 1], while the time domain OCC used by the ports p8 and p9 in the CDM group #4 is [1 −1]. The ports in the CDM group #2 and the ports in the CDM group #5 occupy the same time frequency resources, but use different time domain OCCs. For example, the time domain OCC used by the ports p4 and p5 in the CDM group #2 is

[1 1], while the time domain OCC used by the ports p10 and p11 in the CDM group #5 is [1 −1]. Similarly, all DMRS ports in each CDM group have same QCL parameters, the DMRS ports in different CDM group may have different QCL parameters. The QCL parameters being different means that some QCL parameters or all QCL parameters in the QCL parameter set are different. This type of the CDM group is referred to a type 1 CDM group, that is, a code division group type 1.

For the pattern with the two DMRS symbols, a method for notifying the CDM group type may include that the base station notifies the user of the CDM group type through signaling. Higher layer signaling may include higher layer RRC signaling, MAC signaling or physical layer dynamic signaling also may be used. All of the DMRS ports in each CDM group have the same QCL parameters. The DMRS ports in different CDM groups may have different QCL parameters. DMRS ports in the CDM group of the CDM group type 1 use same code in the time domain and different codes in the frequency domain. For the type 2 CDM group, one type 2 CDM group includes two type 1 CDM groups, and the DMRS ports included in the two type 1 CDM groups occupy the same time frequency resources, and their time domain OCCs are different. The number of DMRS ports included in each CDM group of the type 1 CDM group is half of the number of the DMRS ports included in the each CDM group of the type 2 CDM group.

In this way, for the base station having a small number of antenna panels, or for the users not using the multi-TRP transmission, the base station may be configured in the type 1 CDM group, otherwise needs to be configured in the type 2 CDM group.

Optionally, the base station only needs the maximum number of the port groups of the demodulation reference signal, which is configured by the higher layer signaling to the user, without directly notifying the CDM group (code domain group) type. If the maximum number of port groups of the demodulation reference signal exceeds a threshold, then the CDM group type is type 1, otherwise is type 2.

When transmitting the multiple DMRS ports to one user, the multiple DMRS ports may be divided into multiple type 1 DMRS port groups. All QCL parameters of all ports in each DMRS port group are the same, while the QCL parameters of the ports in different DMRS port groups may be different. So that one DMRS port group may include DMRS ports from one or more CDM groups, and all QCL parameters of these ports are the same. However, the QCL parameters of the DMRS ports in different DMRS groups may be different. In this case, the QCL parameter information of each DMRS group needs to be indicated to the user by the base station by the signaling.

Similar to the LTE, the base station may configure multiple sets of PQI parameters for the user by the higher layer signaling. Each set of PQI parameters includes PDSCH mapping and QCL parameter relevant information, which may indicate the user a Channel state information reference signal (CSI-RS) configuration identifier (ID). The user, when receiving the DMRS and data, uses the RS to which this configuration ID corresponds to perform a relevant estimation of some parameters of the QCL. For example, the CSI-RS is used to estimate the Doppler shift, Doppler spread, average delay and delay spread, then the estimation results is used for the DMRS and data demodulation. Meanwhile, other parameters, such as csi-RS-ConfigZPId-r11, are used to indicate the user positions of some zero-power reference signals, or other reference signals. That is, no data is transmitted on these positions. In this way, the UE knows how to perform a data channel mapping or a rate matching. Usually, the higher layer configures four sets of PQI parameter sets, and then uses 2 bits in the DCI to select one of the PQI parameter sets to the user.

In the NR, there exists a case where the multiple DMRS groups correspond to different QCL parameters, parameters included in each PQI parameter set may vary. The maximum number of the DMRS port groups, which are configured for one user by the base station through the higher layer signaling, is two. That is, each PQI parameter set should be configured with relevant information of two sets of QCL, such as,

```
{
parameter subset 1, which is used for the data channel mapping or the
rate matching
parameter subset 2-1, which indicates a reference signal configuration
ID#0 and estimates relevant QCL parameters
parameter subset 2-2, which indicates a reference signal configuration
ID# 1 and estimates relevant QCL parameters
}
```

The reference signal to which the reference signal configuration ID#0 corresponds and the DMRS port group#0 have a QCL relationship. The reference signal to which the reference signal configuration ID#1 corresponds and the DMRS port group#1 have the QCL relationship. The reference signal to which the reference signal configuration ID#0 or the reference signal configuration ID#1 corresponds may be one or more of a synchronize signal block (SS block), CSI-RS and tracking reference signal (TRS). Generally, the QCL parameters include the Doppler shift, Doppler spread, average delay, delay spread and spatial Rx parameters. So, the reference signal to which reference signal configuration ID#i corresponds and the DMRS port group#i are quasi co-located regarding the Doppler shift, Doppler spread, average delay, delay spread and spatial Rx parameters. Specifically, if the reference signal configuration ID#i includes multiple reference signals, then uses of the multiple reference signals may be different. For example, the reference signal configuration ID#i includes the CSI-RS and the tracking reference signal (TRS). The CSI-RS and the DMRS are quasi co-located with respect to the average delay, delay spread and spatial Rx parameters, while the TRS and the DMRS are quasi co-located with respect to the Doppler shift and Doppler spread.

For a multi-panel transmission, if all data and DMRS ports are from the same oscillator, then only one PTRS port is needed. If the DMRS ports are from different oscillators, then different PTRS ports are needed. Similarly, for the multi-TRP transmission, since the multiple TRPs have different oscillators, multiple PTRS ports are needed. However, the case dynamically varies between the single-TRP transmission and the multi-TRP transmission, and between the single-panel transmission and the multi-panel transmission, different ports are needed. That is, sometimes the PTRS ports needs multiple ports, and sometimes needs signal port, and different cells or different users have different requirements. For example, for a TRP#0 with a single panel, a UE#0 connected to the TRP#0 is a cell-center user, and then the multi-TRP transmission is not needed. So, only one PTRS port is needed. Another UE#1 is a cell-edge user, then the multi-TRP transmission is needed, and in this case the multiple PTRS ports may be needed. To save the signaling overhead, the base station may configure the maximum number of PTRS ports for each user by the higher layer signaling, and dynamically select the number of PTRSs actually transmitted. For example, if the maximum number of PTRS ports configured for the UE#0 by the higher layer signaling is 1, the number of PTRS ports is not needed to be dynamically notified. If the maximum number of PTRS ports configured for the UE#0 by the higher layer signaling is 2, then 1 bit signaling is needed to dynamically notify that the number of PTRS ports is 1 or 2. If the maximum number of PTRS ports configured for the UE#0 by the higher layer signaling is 4, then 2 bits signaling is needed to dynamically notify that the number of PTRS ports. In this way, dynamic signaling overhead may be effectively saved for different cases. However, this method still needs an accurate signaling to indicate the maximum number of PTRS ports.

A method for indicating the maximum number of PTRS ports may include that the maximum number of PTRS ports is equal to the maximum number of the type 1 DMRS port groups. All DMRS ports in the type 1 DMRS port group are quasi co-located with respect to all QCL parameters. Since DMRS ports in the same DMRS port group are quasi co-located with respect to all QCL parameters, then one DMRS group maximally needs one PTRS port. The QCL parameters among different DMRS port groups are not fixed. Each DMRS port group may need one PTRS port, so the maximum number of PTRS ports may not be notified by the signaling, but is predefined to be equal to the maximum number of the type 1 DMRS port groups. In this way, the higher layer signaling overhead may be effectively saved.

That is to say, since different DMRS port groups may come from different TRPs, or from different antenna panels of one TRP, each DMRS port group needs one PTRS port to estimate phase noises. Since different TRPs have different oscillators, different antenna panels may have different oscillators, and phase noises generated by different crystal oscillators are different, the PTRS ports need to be configured independently. For simplification, the DMRS port groups may all have one PTRS port by default. In this way, the base station does not need to additionally notify the number of the PTRS ports because the number of the PTRS ports is equal to the number of the DMRS port groups. Meanwhile, the PTRS may be connected to a DMRS port with the smallest port identifier in the DMRS port group corresponding to the PTRS. That is, a precoding of the PTRS port is the same with a precoding of the DMRS port with the smallest port identifier in the corresponding DMRS port group.

It is to be noted that the QCL parameters include the average gain, Doppler shift, Doppler spread, average delay, delay spread and spatial Rx parameters, or only include the average gain, Doppler shift, Doppler spread, average delay and delay spread, which depends on different cases.

It is assumed that the DMRS only has one symbol and support up to six ports, the DMRS pattern is shown in FIG. 3. It is assumed that the maximum number of the DMRS port groups is two and semi-statically configured by the higher layer signaling (RRC signaling or RRC signaling combined with MAC CE signaling). Combined with the number of the DMRS ports, the DMRS groups may be configured in advance to correspond to the CDM groups. The DMRS ports in one CDM group only belong to one DMRS group. Of course, one DMRS group may include ports to which one or more CDM groups correspond. Table 1 is a demodulation reference signal information indication table according to example 1. As shown in table 1, in indication 6, the p0 corresponds to DMRS group 0, and the p2 corresponds to DMRS group 1. This correspondence relationship may be pre-defined in the table without notifying by the signaling.

Since the maximum number of the DMRS port groups is two, the maximum number of the PTRS ports is two. When only one DMRS group is provided, the PTRS is the port m0, otherwise, the PTRS is the ports m0 and m1. As shown in the table, such as in indication 7, the ports p1 and p3 respectively correspond to the PTRS ports m0 and m1. In indication 9, the ports p0 and p1 correspond to the m0, the port p2 corresponds to the m1, and the m0 and the p1 match. That is, the m0 and the p1 have the same precoding. In indication 10, the port p3 corresponds to the m0, the p4 and p5 correspond to the m1, and the m1 and the p4 match. The m1 and the p4 have the same precoding.

TABLE 1

| Indication | layers | DMRS port (s) | PTRS port |
|---|---|---|---|
| 0 | 1 | p0 | m0 |
| 1 | 1 | p1 | m0 |
| 2 | 1 | p2 | m0 |
| 3 | 1 | p3 | m0 |
| 4 | 1 | p4 | m0 |
| 5 | 1 | p5 | m0 |
| 6 | 2 | p0p2 | m0m1 |
| 7 | 2 | p1p3 | m0m1 |
| 8 | 2 | p4, p5 | m0 |
| 9 | 3 | p0, p1p2 | m0m1 |
| 10 | 3 | p3p4, p5 | m0m1 |
| 11 | 4 | p0, p1<br>p2, p3 | m0m1 |
| 12 | 5 | p0, p1<br>p2, p3, p4 | m0m1 |
| 13 | 6 | p0-p5 | m0 |

All QCL parameters in the DMRS port group are the same. Since the precoding of the PTRS is the same as the precoding of the matched DMRS port, the PTRS and the matched DMRS port are quasi co-located with respect to all parameters of the QCL parameter set, so that it can be concluded that PTRS and the corresponding DMRS port group are quasi co-located with respect to all QCL parameters. As described above, one PTRS port corresponds to one DMRS port group, and matches the DMRS port with the smallest port identifier in the DMRS port group.

Figure 5:
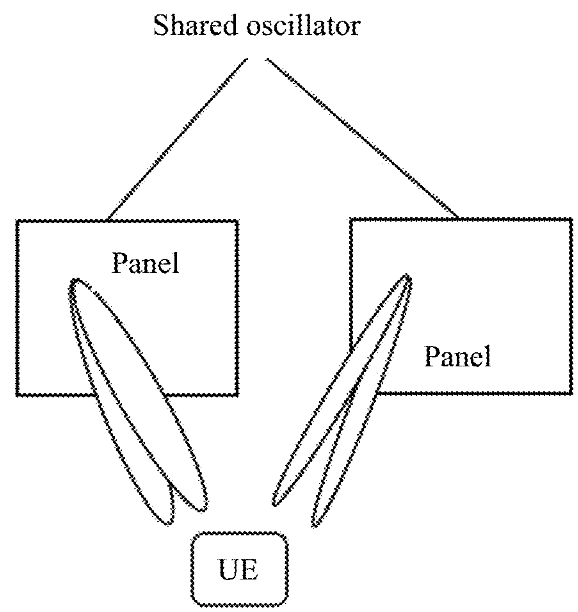
FIG. 5 is a schematic diagram of multiple DMRS port groups sharing one oscillator according to the example 1.

However, a simple reference to the one-to-one correspondence relationship between the PTRS ports and the DMRS port groups may increase the PTRS overhead. If the DMRS port groups from the multiple antenna panels of one TRP share one oscillator, then these DMRS port groups may share one PTRS port. FIG. 5 is a schematic diagram of multiple DMRS port groups sharing one oscillator according to example one. As shown in FIG. 5, since the multiple DMRS port groups may be from different beams, some QCL parameters are different, not all QCL parameters are different. Since the multiple DMRS port groups are from one TRP and sharing one oscillator, actually, two DMRS port groups and the shared PTRS are still quasi co-located with respect to some QCL parameters. Specifically, all DMRSs in the two DMRS port groups are still quasi co-located with respect to Doppler spread and Doppler shift.

To save the overhead, the relationship between the two DMRS port groups needs to be indicated in the PQI parameter set. A method for indicating the PTRS port may include indicating PTRS port information by using indication information of PQI.

In some embodiments, the indication information of PQI is used to indicate the number of the PTRS ports.

One implementation mode is indicating, in the PQI parameter set, whether or not the multiple DMRS port groups are quasi co-located regarding QCL parameters {Doppler spread and Doppler shift}. Each DMRS port group is quasi co-located regarding all QCL parameters. If some DMRS port groups are quasi co-located regarding the QCL parameters {Doppler spread and Doppler shift}, then these DMRS port groups share one PTRS port. If some DMRS port groups are not quasi co-located regarding the QCL parameters {Doppler spread and Doppler shift}, then these DMRS port groups cannot share one PTRS port.

If the parameter subset 3 indicates that the DMRS port groups to which the parameter subsets 2-1 and 2-2 correspond are quasi co-located regarding the QCL parameters {Doppler spread and Doppler shift}, then the two DMRS port groups share one PTRS port, otherwise the two DMRS port groups each have one PTRS port respectively.

```
{
parameter subset 1: used for the data channel mapping or the rate matching
parameter subset 2-1: indicates the reference signal configuration ID#0 and estimates relevant QCL parameters
parameter subset 2-2: indicates the reference signal configuration ID#1 and estimates relevant QCL parameters
parameter subset 3: used for indicating whether or not the DMRS port group to which the parameter subset 2-1 corresponds and the DMRS port group to which the parameter subset 2-2 corresponds are quasi co-located regarding the QCL parameters
{Doppler spread and Doppler shift}
}
```

Another direct mode is directly indicating, in the PQI parameter set, whether or not the multiple DMRS port groups share one PTRS port. For a case of two DMRS port groups, if the two DMRS port groups share one PTRS port, only one PTRS port is configured. If the two DMRS port groups do not share one PTRS port, two PTRS ports need to be configured.

```
{
parameter subset 1: used for the data channel mapping or the rate matching
parameter subset 2-1: indicates the reference signal configuration ID#0 and estimates relevant QCL parameters
parameter subset 2-2: indicates the reference signal configuration ID#1 and estimates relevant QCL parameters
parameter subset 3: used for indicating whether or not the DMRS port group to which the parameter subset 2-1 corresponds and the DMRS port group to which the parameter subset 2-2 corresponds share the PTRS port
}
```

If the PQI parameter set includes only one parameter subset for calculating relevant QCL parameters, then the parameter subset 3 is not used because in this case there is only one parameter subset, which means that there is only one DMRS port group.

Another implementation mode is that the UE determines, according to different reference signal configurations indicated in the PQI parameter set, quasi-colocation situation of different DMRS port groups regarding the QCL parameters {Doppler spread and Doppler shift}. If a certain reference signal included in the reference signal configuration ID#0 indicated by the parameter subset 2-1 and a certain reference signal included in the reference signal configuration ID#1 indicated by the parameter subset 2-2 are quasi co-located regarding parameters {Doppler spread and Doppler shift}, then the DMRS port groups to which the parameter subset 2-1 and parameter subset 2-2 correspond may share one PTRS port, otherwise two PTRS ports need to be configured for the DMRS port groups to which the parameter subset 2-1 and parameter subset 2-2 correspond.

```
{
parameter subset 1: used for the data channel mapping or the rate matching
parameter subset 2-1: indicates the reference signal configuration ID#0 and estimates relevant QCL parameters
parameter subset 2-2: indicates the reference signal configuration ID#1 and estimates relevant QCL parameters
}
```

Table 2 is a table of four sets of PQI parameters according to example 1. As shown in table 2, the base station configures the four sets of PQI parameters through the higher layer signaling, and the maximum number of the DMRS port groups configured by the base station for the user is two, that is, up to two parameter subsets indicate different QCL parameters. It is assumed that NZP CSI-RS is used for estimating the QCL parameters {average delay, delay spread and spatial Rx parameters}, while the TRS is used for estimating the QCL parameters {Doppler spread and Doppler shift}. Since in the first set of PQI parameters and the second set of PQI parameters, TRS resources included in the reference signal configuration indicated by the parameter subset 2-1 and TRS resources included in the reference signal configuration indicated by the parameter subset 2-2 are the same, the two DMRS port groups to which the parameter subsets 2-1 and 2-2 correspond are quasi co-located regarding the QCL parameters {Doppler spread and Doppler shift}, then the two DMRS port groups share one PTRS port. So additional signaling indication is not needed, the UE only needs to determine, according to whether the reference signals configured by different parameter subsets are quasi co-located regarding {Doppler spread and Doppler shift}, whether corresponding DMRS port groups share the PTRS port.

TABLE 2

| PQI parameter | | Parameter set 1 | Parameter set 2 | | |
|---|---|---|---|---|---|
| First set of PQI parameters | Subset 2-1 | ZP CSI-RS ID#0 | NZP CSI-RS ID#0 | TRS ID#0 | . . . |
| | Subset 2-2 | | NZP CSI-RS ID#0 | TRS ID#0 | . . . |
| Second set of PQI parameters | Subset 2-1 | ZP CSI-RS ID#1 | NZP CSI-RS ID#0 | TRS ID#0 | . . . |
| | Subset 2-2 | | NZP CSI-RS ID#1 | TRS ID#0 | . . . |
| Third set of PQI parameters | Subset 2-1 | ZP CSI-RS ID#2 | NZP CSI-RS ID#2 | TRS ID#0 | . . . |
| | Subset 2-2 | | NZP CSI-RS ID#3 | TRS ID#2 | . . . |
| Fourth set of PQI parameters | Subset 2-1 | ZP CSI-RS ID#3 | NZP CSI-RS ID#0 | TRS ID#2 | . . . |
| | Subset 2-2 | | NZP CSI-RS ID#2 | TRS ID#3 | . . . |

This method may need the higher layer signaling to inform the user that the reference signals of which resources are quasi co-located regarding {Doppler spread and Doppler shift}. Then, after the user is notified of the reference signal to which the reference signal configuration ID#0 in the parameter subset 2-1 corresponds and the reference signal to which the reference signal configuration ID#1 in the parameter subset 2-2 corresponds, if reference signal resources regarding the parameters {Doppler spread and Doppler shift}are different, then the user may determine, according to the higher layer signaling, whether or not the DMRS port groups corresponding to the different reference signal resources are Quasi co-located regarding {Doppler spread and Doppler shift}. For example, in the third set of PQI parameters of the above table two, if the NZP CSI-RS ID#2 and NZP CSI-RS ID#3 are configured to be Quasi co-located regarding {Doppler spread and Doppler shift} by the higher layer signaling, then the UE knows that the two DMRS port groups share the PTRS.

It is to be noted that the reference signals included in the reference signal configuration ID indicated by each parameter subset may be one or more reference signal types, such as the CSI-RS and TRS, and may also be one or more reference signal resources of one reference signal type, as shown in the above table two.

More directly, a method for notifying PTRS information is that the base station may use the PQI indication information to directly indicate the PTRS port identifier. As described below, the PTRS port identifier is directly indicated in the subsets 2-1 and 2-2 which indicate relevant QCL parameters.

{
Parameter subset 1: used for the data channel mapping or the rate matching.
parameter subset 2-1: indicates the reference signal configuration ID#0, estimates relevant QCL parameters and indicates the PTRS port identifier
parameter subset 2-2: indicates the reference signal configuration ID#1, estimates relevant QCL parameters and indicates the PTRS port identifier
}

That is to say, the reference signal configurations ID#0 and ID#1 indicated by the parameter subsets 2-1 and 2-2 include the PTRS one or more port identifiers. The PTRS one or more port identifiers indicated by the parameter subsets 2-1 and 2-2 may be the same or different. If PTRS one or more port identifiers indicated by the parameter subsets 2-1 and 2-2 are same, the PTRS is shared, otherwise the PTRS is not shared. Table 3 is a table of four sets of PQI parameters according to example one.

TABLE 3

| PQI parameter | | Parameter set 1 | Parameter set 2 | | |
|---|---|---|---|---|---|
| First set of PQI parameters | Subset 2-1 | ZP CSI-RS ID#0 | NZP CSI-RS ID#0 | TRS ID#0 | PTRS port 0 |
| | Subset 2-2 | | NZP CSI-RS ID#0 | TRS ID#0 | PTRS port 0 |
| Second set of PQI parameters | Subset 2-1 | ZP CSI-RS ID#1 | NZP CSI-RS ID#0 | TRS ID#0 | PTRS port 0 |
| | Subset 2-2 | | NZP CSI-RS ID#1 | TRS ID#0 | PTRS port 0 |
| Third set of PQI parameters | Subset 2-1 | ZP CSI-RS ID#2 | NZP CSI-RS ID#2 | TRS ID#0 | PTRS port 0 |
| | Subset 2-2 | | NZP CSI-RS ID#3 | TRS ID#2 | PTRS port 1 |
| Fourth set of PQI parameters | Subset 2-1 | ZP CSI-RS ID#3 | NZP CSI-RS ID#0 | TRS ID#2 | PTRS port 0 |
| | Subset 2-2 | | NZP CSI-RS ID#2 | TRS ID#3 | PTRS port 1 |

As shown in table 3, there are two types of DMRS groups. All DMRS ports in the type 1 DMRS group are Quasi co-located regarding all QCL parameters, while all DMRS ports in the type 2 DMRS group are Quasi co-located regarding {Doppler spread and Doppler shift} or share one PTRS port, so the type 2 DMRS group may include one or more type 1 DMRS groups.

The higher layer signaling described in the present application refers to the RRC signaling, MAC layer signaling or RRC signaling plus MAC signaling.

Since no PQI signaling is defined in the NR, the PQI signaling described in the present application may only include relevant QCL information or include both of PDSCH mapping information and the relevant QCL information.

In the above solutions, in examples of indicating PTRS port information by using the PQI signaling, one set of PQI parameters including two DMRS port groups. In practice, one set of PQI parameters may include more than two DMRS port groups.

For example, the base station directly indicates the PTRS port identifier by using the PQI indication information. Four DMRS port groups are described below.

{
Parameter subset 1 is used for the data channel mapping or the rate matching
Parameter subset 2-1 indicates the reference signal configuration ID#0, estimates relevant QCL parameters and indicates the PTRS port identifier
Parameter subset 2-2 indicates the reference signal configuration ID#1, estimates relevant QCL parameters and indicates the PTRS port identifier
Parameter subset 2-3 indicates the reference signal configuration ID#1, estimates relevant QCL parameters and indicates the PTRS port identifier.
Parameter subset 2-4 indicates the reference signal configuration ID#1, estimates relevant QCL parameters and indicates the PTRS port identifier.
}

In addition, optionally, the base station may respectively indicate QCL information of the multiple DMRS port groups by using independent PQI signaling. In this way, one PQI indication needs two PQI indication fields. This method may be applied to the solution described in the present application.

PQI indication field 1
{
parameter subset 1 is used for the data channel mapping or the rate matching
Parameter subset 2-1 indicates the reference signal configuration ID#0, estimates relevant QCL parameters used for a DMRS port group #0 and indicates the PTRS port identifier
}
PQI indication field 2
{
Parameter subset 1 is used for the data channel mapping or the rate matching
Parameter subset 2 indicates the reference signal configuration ID#0, estimates relevant QCL parameters used for a DMRS port group # 1 and indicates the PTRS port identifier
}

Described below are several examples of the above embodiment. The example numbers are merely used to distinguish different examples, and are not necessarily used to represent a priority order.

Example 1a

DMRS Type 1

Figure 6:
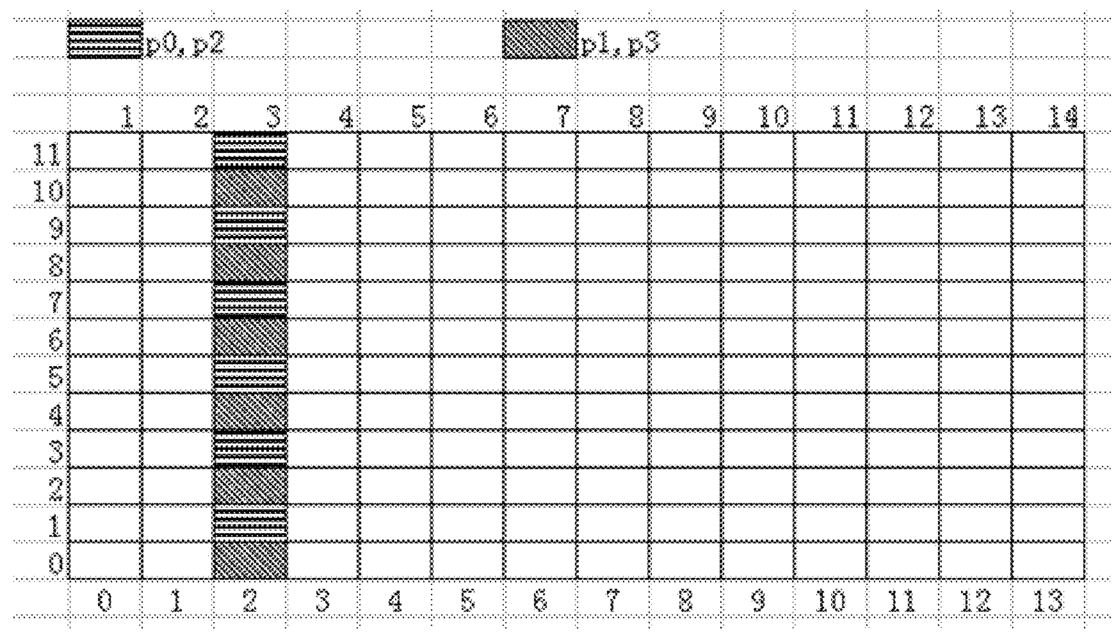
Figure 7:
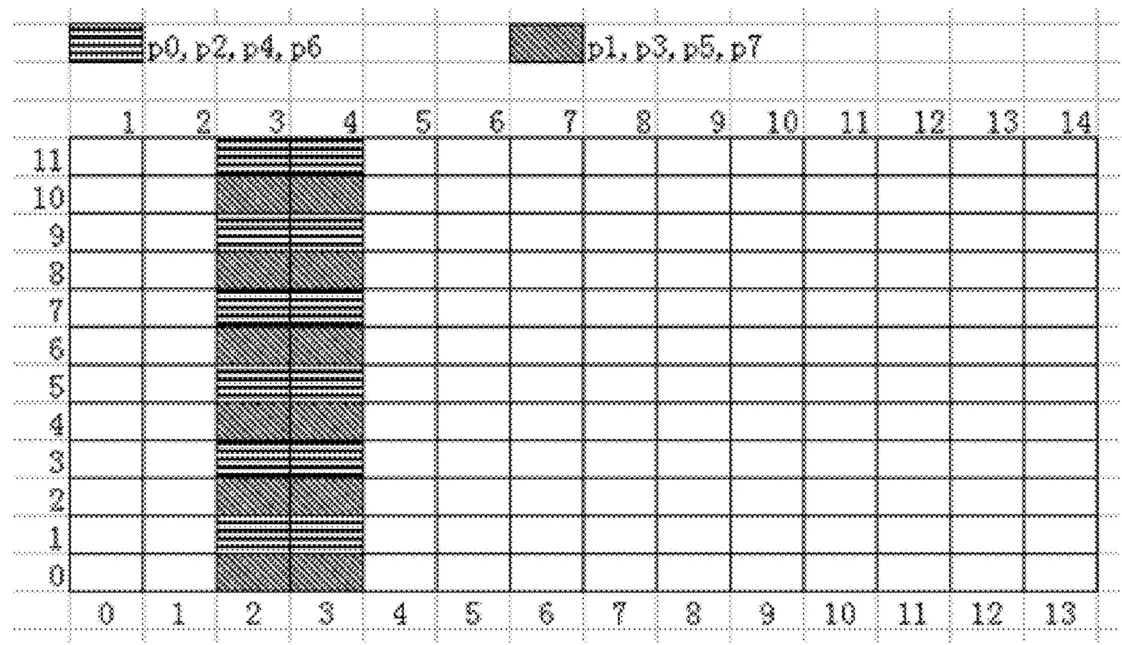

The DMRS pattern based on an Interleaved Frequency domain multiplexing (IFDM) is referred to DMRS type 1, which may effectively support up to four ports when the DMRS includes one symbol (as shown in FIG. 6) and support up to eight ports when the DMRS includes two symbols (as shown in FIG. 7).

FIG. 6 is a schematic diagram 1 of the demodulation reference signal type 1 according to example 1a. As shown in FIG. 6, the DMRS ports are divided into two CDM groups. The CDM group #0 includes ports p0 and p2. The ports p0 and p2 occupy the same time frequency resources, and are distinguished by different codes, such as different cyclic shift (CS) sequences. The CDM group #1 includes ports p1 and p3. The ports p1 and p3 occupy the same time frequency resources, and are distinguished by different codes.

FIG. 7 is a schematic diagram 2 of a demodulation reference signal type 1 according to example 1a. In FIG. 7, the eight ports are divided into two CDM groups. The CDM group #0 includes ports p0, p2, p4 and p6. The ports p0, p2, p4 and p6 occupy the same time frequency resources. The ports p0 and p2 use different codes on the frequency domain. For example, the port p0 uses CS sequence 0, and the port p2 uses CS sequence 1. The ports p4 and p6 also use different codes on the frequency domain. The ports p0 and p2 use same OCC on the time domain. The ports p4 and p6 also use same OCC on the time domain, which is different from the OCC used by the ports p0 and p2 on the time domain. Similarly, the CDM group #1 includes ports p1, p3, p5 and p7. The CS sequences used by the ports p1 and p3 on the frequency domain are different, while the ports p1 and p3 use the same OCC on the time domain. The CS sequences used by the ports p5 and p7 on the frequency domain are different, while the ports p5 and p7 use the same OCC on the time domain, which is different from the code used by the ports p1 and p3 on the time domain. All ports in one CDM group are mapped onto the same time frequency resources, and are distinguished by different time domain codes or frequency domain codes. This type of CDM group is referred to as a type 2 CDM group.

Similar to the DMRS type 2, if the number of the CDM groups is limited to two, it means that the number of the DMRS port groups is limited to two. That is, up to two beam transmissions with different QCLs are supported, which may limit the scheduling, especially during the multi-TRP and multi-panel transmission.

To support more DMRS port groups, for the DMRS pattern with two symbols, as shown in FIG. 7, optionally, the eight DMRS ports are divided into four CDM groups. The CDM group #0 includes ports p0 and p2. The ports p0 and p2 use different codes on the frequency domain. For example, the port p0 uses CS sequence 0, and the port p2 uses CS sequence 1. The CDM group #1 includes ports p1 and p3. The ports p1 and p3 use different codes on the frequency domain. The CDM group #2 includes ports p4 and p6. The ports p4 and p6 use different codes on the frequency domain. The CDM group #3 includes ports p5 and p7. The ports p5 and p7 use different codes on the frequency domain. The DMRS ports in the CDM group #0 and the DMRS ports in the CDM group #2 occupy the same time frequency resources, and are distinguished by different time domain OCCs. Similarly, the DMRS ports in the CDM group #1 and the DMRS ports in the CDM group #3 occupy the same time frequency resources, and are distinguished by different time domain OCCs. In this way, the DMRS ports may be divided into up to four DMRS port groups. This type of CDM group is referred to as the type 1 CDM group, that is, a code domain group type 1.

A method for indicating the CDM group type may include that the base station notifies the user of the CDM group type by using signaling. The signaling generally refers to the higher layer RRC signaling, and the signaling may also be the MAC signaling or the physical layer dynamic signaling. DMRS ports in each CDM group have the same QCL parameters. The QCL parameters of the DMRS ports in different CDM groups may be different. For the type 1 CDM group, the DMRS ports in the CDM group use the same codes on the time domain, and use different codes on the frequency domain. One type 2 CDM group includes two type 1 CDM groups, and the DMRS ports included in the two type 1 CDM groups occupy the same time frequency resources, and use different time domain codes. The number of DMRS ports included in each CDM group of the CDM group type 1 is half of the number of the DMRS ports included in the each CDM group of the CDM group type 2.

In this way, for the base station which has a small number of antenna panels, or for the users not using the multi-TRP transmission, the base station may be configured according to the CDM group type 1, otherwise the base station needs to be configured according to the CDM group type 2. Such design is beneficial to the DMRS signaling design. DMRS information notifications may be designed independently for different CDM types.

Another method for implicitly indicating the CDM group type is that the base station indicates the CDM group type implicitly by indicating the maximum number of the DMRS port groups. If the maximum number of the DMRS port groups of which the user is notified is greater than N, the CDM group type is type 1, otherwise the CDM group type is type 2.

For the DMRS type 1, the PTRS port information may also be indicated by the indication information of PQI. In some embodiments, the indication information of PQI is used to indicate the number of the PTRS ports.

One implementation mode is indicating, in the PQI parameter set, whether the multiple DMRS port groups are quasi co-located regarding QCL parameters {Doppler spread and Doppler shift}.

In some embodiments, the UE determines, according to different reference signal configurations indicated in the PQI parameter set, whether different DMRS port groups are quasi co-located with respect to the QCL parameters {Doppler spread and Doppler shift}. If a reference signal included in the reference signal configuration ID#0 indicated in the parameter subset 2-1 and a reference signal included in the reference signal configuration ID#1 indicated in the parameter subset 2-2 are quasi co-located with respect to parameters {Doppler spread and Doppler shift}, then the DMRS port groups corresponding to the parameter subset 2-1 and parameter subset 2-2 may share one PTRS port, otherwise two PTRS ports need to be configured for the DMRS port groups corresponding to the parameter subset 2-1 and parameter subset 2-2. In this case, a third parameter set does not need to be introduced to associate the QCL parameter set corresponding to the DMRS port group.

It is to be noted that though the base station indicates the number of the PTRS ports by the PQI, such as one, in practice, the PTRS may be not transmitted on this port, which also depends on factors such as a Modulation and Coding Scheme (MCS) configured for the user and bandwidth. If the MSC is too small, or the number of allocated bandwidth resources or the number of allocated Physical Resource Blocks (PRB) is too small, and then the PTRS is not transmitted. In addition, the PTRS is the reference signal used for phase tracking, and may also be a special DMRS.

The method described above mainly uses the PQI signaling to jointly indicate information such as the number of PTRS ports and one or more port identifiers. This method is mainly used in downlink because relevant QCL indication information is generally in the downlink. For the uplink, if there is no relevant QCL signaling, how to notify the user of the number of the PTRS ports and the one or more port identifiers is a problem. One direct method is using clear signaling to dynamically indicate the PTRS port information, which increases the overhead of DCI used for notifying uplink scheduling information.

In the NR, not only the base station may be provided with multi-antenna, but also the user have many antennas, and may have many antenna panels. If different antenna panels share the same oscillator, then the user only needs one PTRS port. However, if different antenna panels do not share the oscillator, then the DMRS ports from different panels need to correspond to the PTRS ports independently. In other words, if some DMRS ports are from the same panel, then these DMRS ports correspond to one PTRS port, otherwise these DMRS ports may correspond to different PTRS ports.

In addition, in the NR, the base station performs a beam training before scheduling user data. For example, the base station configures multiple SRS resources for one user by the higher layer signaling. Each SRS resource represents a respective beam transmitted by the user. For example, if the user has two antenna panels, each panel may transmit the SRS by the beams in four different directions, the two panels need to be configured with eight SRS resources to transmit the beams in eight different directions. The IDs of the eight SRS resources may be from 0 to 7. After the user transmits eight SRSs with different beams on the configured 8 SRS resources, the base station may determine which beam or beams are better in data transmission by means of measurement. So when scheduling the user to transmit uplink data, the base station needs to notify the user of using which beam to transmit data in the DCI. In this case, the base station may notify the user of a SRS resource indicator (SRI) value in the DCI. The SRI represents the ID of the SRS resource that was used for data transmission.

The base station may only notify the user of one SRI, in this case, the beam used by the user for transmitting data is the same as the beam used by the SRS resource transmitted before and corresponding to the SRI. Since one SRI generally corresponds to one SRS resource, generally corresponds to one analog beam and is from one panel, one SRI just needs to be correspondingly configured with one PTRS port. When transmitting data, the user uses the analog beam corresponding to the SRI to transmit data. The analog transmission beam may have different digital beams corresponding to different DMRS ports. That is to say, although the base station indicates one SRS to the user, uplink DMRS ports may also be multiple. When a channel reciprocity does not hold, the base station also needs to configure a Transmit precoder matrix indicator (TPMI) for the user, and the user performs an uplink pre-coding according to an indication of the TPMI.

In addition, the base station may also notify the user of multiple SRIs. Each SRI corresponds to one beam and corresponds to one SRS resource. To simplify the standard, it is possible to implement by way of one SRS corresponding to one DMRS port. That is, the user transmits the data by using the beams indicated by allocated multiple SRIs when transmitting the data. Each beam corresponds to one DMRS port. In this case, if the beams indicated by the multiple SRIs are from different antenna panels, then one PTRS is apparently not enough. If the beams indicated by the multiple SRIs are from one antenna panel, one PTRS is enough.

It can be seen that the base station may use the SRI signaling to indicate the PTRS port information, including the number of ports and port ID. If the base station notifies the user that only one SRI is used for transmitting the uplink data, then the only one PTRS port may be used. However, if the base station notifies the user that multiple SRIs are used for transmitting the uplink data, then the number of PTRS ports may be one or multiple.

A method for indicating uplink PTRS port information may include that the first communication node notifies the second communication node of the configuration information of the transmission beam and the configuration information of phase tracking reference signal through the joint signaling.

In some embodiments, the configuration information of the phase tracking reference signal includes at least one of: the number of phase tracking reference signal ports, one or more port identifiers of the phase tracking reference signal ports and the maximum number of the phase tracking reference signal ports.

In some embodiments, the configuration information of the transmission beam includes at least one of: the resource indication of the sounding reference signal and the precoding information indication.

In some embodiments, the configuration information of the transmission beam includes at least one of the resource indication of the sounding reference signal and a downlink reference signal resource indication.

SRI is the ID of the resource indication of the SRS resource. In addition to the SRI, the base station may notify the user of the precoding information TPMI. If TPMIs between two SRIs are related, for example, the TPMIs corresponding to the two SRIs indicated to the user at the same time by the base station have a phase difference, the beams corresponding to the two SRIs belong to the same panel. The beams corresponding to the two SRIs are equivalent to being subjected to a linear combination. In this case, the DMRS ports corresponding to the two SRIs may share one PTRS port. Otherwise effects of the linear combination may be affected by the phase noises.

In some embodiments, SRS resource configuration includes the PTRS port information. Generally, the base station configures N SRS resources for the user by the higher layer signaling, and then the user periodically transmits the SRSs on the N SRS resources, or aperiodically transmits some SRSs of the N SRS resources, or semi-persistently transmits it. During the configuration of the higher layer signaling, the configuration information of one SRS resource generally includes multiple or all of a SRS bandwidth, starting position, frequency domain density, the number of antenna ports, whether or not performing a frequency hopping, cycle and the like.

```
SRS resource ID#i
{
SRS bandwidth,
frequency domain position,
frequency domain density,
time domain position,
the number of antenna ports,
frequency hopping information,
cycle
. . .
}
```

When the high layer signaling configures these parameters of one SRS resource, the base station may add one item, that is, the PTRS port information, such as the PTRS port identifier. The maximum PTRS port identifier may be the maximum number of the PTRS ports reported by the user. So during the configuration of the base station by using the higher layer signaling, the configuration parameters of the SRS resource are described below, and the PTRS port ID is added.

```
SRS resource ID#i
{
SRS bandwidth,
frequency domain position,
frequency domain density,
time domain position,
the number of antenna ports,
frequency hopping information,
cycle,
. . .
PTRS port ID
}
```

If one user supports up to one PTRS port, then the ID of the PTRS port is 0 by default, or the PTRS port information may not be provided. If one user supports up to two PTRS ports, then the IDs of the PTRS ports may be 0 or 1.

For example, one user supports a maximum of two PTRS ports. That is, the user has two antenna panels. Each panel corresponds to N SRS resources, that is, each panel corresponds to N beams. When the base station configures 2N SRS resources through the higher layer signaling, in the first N SRS resources, the ID of the PTRS port is 0, and in the last N SRS resources, the ID of the PTRS port is 1. In this way, the base station indicates multiple SRIs when notifying uplink scheduling data through the DCI, such as two SRIs, which correspond to two DMRS ports. After receiving two SRI values, the user may correspondingly find the IDs of the PTRS ports configured in the SRS resources corresponding to the two SRIs. If the IDs of the PTRS ports configured in the SRS resources corresponding to the two SRIs are the same, then the DMRS ports corresponding to the two SRIs are from the same panel, that is, the DMRS ports share one PTRS port. Otherwise two PTRS ports are needed. So the resource configuration of the SRS includes the PTRS port information. The resource configuration of the SRS is configured by the higher layer signaling, generally is configured by the RRC signaling. That is to say, when the base station configures resource configuration information of the SRS by the higher layer signaling, the PTRS port information has been configured already.

In some embodiments, it is not necessary to configure the PTRS port information in the resource configuration information of each SRS. The SRS resources that may share one PTRS port are configured into one SRS resource set or SRS resource group. Each SRS resource set corresponds to one PTRS port. Different SRS resource sets correspond to different PTRS ports. For example, based on the above example, the base station configures two SRS resource sets for the user. A first SRS resource set includes N SRS resources, the resource IDs are from 0 to N−1. A second SRS resource set also includes N SRS resources, the resource IDs are from N to 2N−1. When the base station schedules the user uplink data, the base station schedules one or more SRIs. Each SRS corresponds to one SRS resource, and thus corresponds to one SRS resource set. If the SRIs allocated to the user belong to the same SRS resource set, the DMRS ports corresponding to these SRIs share one PTRS port, otherwise multiple PTRS ports are allocated to the DMRS ports. For a better understanding, the SRS resource set number may be simply considered as the PTRS port identifier.

The first SRS resource set {SRS resource ID#0, ID#1 . . . ID#N−1}.

The second SRS resource set {SRS resource ID#N, ID#N+1 . . . ID#2N−1}.

Generally speaking, the first communication node notifies the second communication node of the configuration information of the transmission beam and the configuration information of the phase tracking reference signal through the joint signaling. In some embodiments, the configuration information of the phase tracking reference signal includes at least one of the number of phase tracking reference signal ports, the one or more port identifiers of phase tracking reference signal ports and the maximum number of the of phase tracking reference signal ports. The configuration information of the transmission beam at least includes information indicating the sounding reference signal resource. Generally, the resource indication of SRS refers to the resource ID of SRS. Each SRS resource corresponds to the configuration information of the SRS resource, which is configured by the base station using the higher layer signaling. That is, each resource indication of SRS corresponds to the information indicating the resource of one sounding reference signal. The resource indication information refers to the configuration information of the SRS resource, and may also include the configuration information of the SRS resource set. The information indicating the sounding reference signal resource or the configuration information of the SRS resource set includes the PTRS port information.

A whole process is described below. The first communication node notifies the second communication node of the configuration information of the phase tracking reference signal and the SRI by using the joint signaling. Each SRI corresponds to one SRS resource. One SRS resource corresponds to one SRS resource set. One SRS resource set corresponds to one PTRS port. After obtaining the SRI notified by the base station, the user obtains the PTRS port information.

Optionally, the beams corresponding to the SRSs in one SRS resource set may come from the same antenna panel. In this way, different SRS resource sets correspond to different antenna panels. The DMRSs corresponding to all beams in one SRS resource set correspond to the same PTRS port identifier. The DMRSs corresponding to beams of different SRS resource sets correspond to the same PTRS port identifier or different PTRS port identifiers, which depends on whether the antenna panels corresponding to the different SRS resource sets share the oscillator. If the different SRS resource sets share the oscillator, the different SRS resource sets correspond to the same PTRS port identifier. Otherwise, the different SRS resource sets correspond to different PTRS port identifiers. For a better understanding, it can simply considered that each SRS resource set is correspondingly configured with one PTRS port identifier. A PTRS ID#0 may be equal to or not equal to a PTRS ID#1, which depends on the configuration of the base station. That is, at least each SRS resource set corresponds to the same PTRS port identifier.

The first SRS resource set {[SRS resource ID#0, ID#1 . . . ID#N−1], PTRS ID#0}.

The second SRS resource set {[SRS resource ID#N, ID#N+1 . . . ID#2N−1], PTRS ID#1}.

Of course, the concept of SRS resource set may be not provided. In this case, the PTRS port information needs to be carried in the configuration of each SRS resource.

In conclusion, the configurations of the SRS resource and the resource set are configured by the base station by using the higher layer signaling, rather than dynamically configured by the physical layer. The base station configures multiple SRS resources, and then notifies the user of the IDs of one or more of the multiple SRS resources by using the physical layer dynamic signaling.

The scheme of carrying PTRS port information in the SRI and SRS resource configuration may be well applied to almost all scenarios. Especially when the channel has no reciprocity, the beam training must rely on transmitting the SRS. When the channel has reciprocity, the base station may not use the SRI to indicate the beam by using which the user transmits data, but use downlink reference signal resource ID. That is, the transmission beam configuration information used for indicating the PTRS port information includes a downlink reference signal resource indication. The downlink reference signal resource indication may be a CSI-RS resource indication, that is, a CSI-RS resource Indicator (CRI), and may also be a synchronization signal resource or ID indication. The base station indicates one or more CSI-RS resources by using the CRI. The user uses a reception beam corresponding to the CRI to receive this CSI-RS. The reception beam will be used for data transmission. Similar to the PTRS port information carried by the configuration information of the SRI and the SRS, the resource configuration information of the CRI and the CSI-RS may also be used to carry the PTRS port information. For example, the base station divides these CSI-RS resources into multiple sets when configuring the CSI-RS resources by using the higher layer signaling. Each set is correspondingly configured with one PTRS port identifier. The PTRS port here refers to uplink PTRS port information.

In addition, the first communication node described in the present application generally refers to the base station, and the second communication node generally refers to the user. Of course, the first communication node may refer to the user, which is used in a D2D communication.

In addition, the PTRS described in the present application is generally used for the phase noise estimation, and may be used for other purposes. Therefore, PTRS described in the present application is only a name of a reference signal, and does not exclude other reference signals. For example, the PTRS is a special demodulation reference signal. Generally, the base station uses the higher layer signaling to configure the existence of the PTRS, which depends on high frequencies or low frequencies. If the high layer signaling configures that the PTRS exists, whether or not the PTRS is actually transmitted and the PTRS density are also related to the MCS and bandwidth allocated to the user during the scheduling.

Described below are examples that the base station indicates the DMRS configuration information by using the PQI indication information.

In some embodiments, the PQI indication information is used for indicating the number of symbols of the DMRS.

In some embodiments, the PQI indication information is used for indicating the DMRS type.

In some embodiments, the base station uses the PQI indication information to indicate the type of the table indicating DMRS information. Multiple tables for indicating DMRS information are predefined or configured by the higher layer signaling.

It can be seen from FIGS. 3 and 4 (DMRS type 2), FIGS. 6 and 7 (DMRS type 1), to achieve a sufficient flexibility, the standard needs to support demodulation reference signal type 1 and demodulation reference signal type 2, and each demodulation reference signal type needs to support a case of one DMRS and a case of two DMRSs.

To save dynamic signaling overhead, the base station may use the higher layer signaling to configure the demodulation reference signal type for the user, meanwhile, may also use the higher layer signaling to configure the number of symbols of the demodulation reference signal for the user. In this way, when designing the DCI signaling, each of the case of one DMRS symbol and the case of two DMRS time domain symbols of each DMRS type needs to be independently designed with one table to notify the DMRS port identifiers, the number of the DMRS ports, scramble sequence ID and whether or not being transmitted with the data simultaneously. Therefore, the signaling overhead in the DCI is greatly reduced. As shown in tables 4-7, for each DMRS type, each symbol only needs five bits (that is, a value corresponding to an indication status is less than or equal to 32). Based on the semi-static configuration, the base station may configure the DMRS symbol quantity (one DMRS symbol or two DMRS symbols) according to the average traffic volume and the number of users of the cell, so that the overhead of the DCI for indicating the DMRS information in controlled within 5 bits. If the number of the users in the cell is small and traffic volume is not large, the number of the users involved a multi-user scheduling at the same time is not too big. If the number of DMRS ports required by the users is not large, the base station may semi-statically configure one DMRS symbol to the users of the cell. In this case, for the DMRS type 2, up to six DMRS ports are supported and for the DMRS type 1, up to 4 DMRS ports are supported. If the number of the users in the cell is large and the traffic volume is big, and the total number of DMRS ports for the multi-user scheduling is often big, the base station may configure two DMRS symbols for the users of the cell. In this case, for the DMRS type 2, up to 12 DMRS ports are supported, and for the DMRS type 1, up to 8 DMRS ports are supported.

Figure 8:
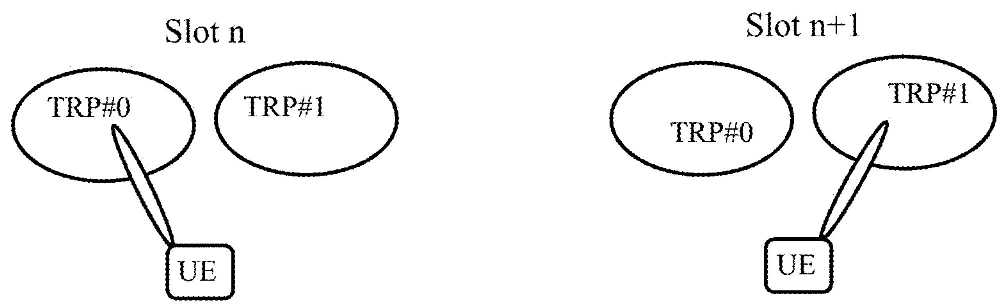
FIG. 8 is a schematic diagram of multipoint dynamic switching transmission according to the example 2.

However, this method of semi-statically configuring the symbol quantity of DMRS limits the scheduling flexibility, especially for the users involved in the multipoint transmission, such as the users performing Dynamical point selection (DPS) transmission. It is assumed that the DMRS type is semi-statically configured for the user by RRC signaling, and is same in each cell. FIG. 8 provides a schematic diagram of a multipoint dynamic switching transmission. As shown in FIG. 8, at slot n, a transmission receiver point (TRP)#0 transmits data to the UE#0, while at slot n+1, a TRP#1 transmits data to the UE#0. The base stations transmitting data to the UE#0 are dynamically switched. In this case, since the number of connected users and traffic volume in the TRP#0 may be different from that in the TRP#1, the DMRS symbol quantity required in TRP#0 may be different from that in TRP#1. For example, for TRP#0, in the service cell of UE#0, the traffic volume is big and the number of connected users is large, two DMRS symbols are generally required, so the number of DMRS symbols that the TRP#0 configures for UE#0 through the RRC signaling is two. TRP#1 has a small traffic volume and few connected users. For saving the overhead and a more efficient DMRS design, the base station just needs to configure one DMRS symbol for the user. In this case, since different TRPs need different DMRS symbol quantities, semi-statically configuring the DMRS symbol quantity may have problems. When the TRP which transmits data to the UE#0 is switched to the TRP#0, since the DMRS symbol quantity semi-statically configured to the UE#0 is still 2, the TRP#1 is forced to use 2 DMRS symbols to transmit data to the UE#0, causing unnecessary waste. If other users in the TRP#1 want to perform a joint multi-user scheduling with the UE#0, the DMRS symbol quantities are not equal, because other users in the TRP#1 are likely to be semi-statically configured with 2 DMRS symbols.

If the symbol number of the DMRS is configured in a completely flexible way, for each DMRS type, the base station need to dynamically indicate the DMRS information about one symbol and 2 symbols through the DCI signaling, which increases at least 1 bit DCI overhead.

A method for indicating the symbol number of the DMRS is that the base station uses indication information of QCL and the data channel mapping (PQI: PDSCH RE Mapping and Quasi-Co-Location Indicator) to indicate the symbol number of the DMRS. The indication information of QCL and the data channel mapping is similar to the information indication in the table 7.1.9-1 of the LTE standard 36.213. As described in the standard 36.213, generally, the base station uses the higher layer signaling to configure multiple sets (for example, 4 sets) of parameters to indicate the PDSCH RE Mapping and Quasi-Co-Location Indicator. As described in DCI format 2D in the standard 36.213, the base station indicates which one of the multiple sets configured by the higher layer by using signaling of several bits, such as 2 bits. If it is a DPS scheduling, the multiple sets of PQI parameters configured by the higher layer may correspond to different TRP transmissions. For reasonably and flexibly configuring different DMRS symbols for different TRPs, parameters indicated by the PQI may include the symbol number of the DMRS. Therefore, multiple sets of PQI parameters configured by the higher layer may contain different DMRS symbol quantities. In other words, the PQI and the symbol number of the DMRS are jointly indicated. For example, two sets of PQI parameters configured by the base station through the higher layer signaling are separately configured as follows:

```
the first set of PQI parameters
{
parameter subset 1: ZP-CSI-RS ID#0
parameter subset 2-1: NZP CSI-RS ID#0
parameter subset 2-2: NZP CSI-RS ID#1
. . .
parameter subset i: one DMRS symbol
}
the second set of PQI parameters
{
parameter subset 1: ZP-CSI-RS ID#3
parameter subset 2-1: NZP CSI-RS ID#3
parameter subset 2-2: NZP CSI-RS ID#4
. . .
parameter subset i: two DMRS symbols
}
```

In the DCI, the base station uses the dynamic physical layer signaling to indicate which set of PQI parameters, thereby achieving the purpose of dynamically indicating the symbol number of DMRS without additionally adding physical layer dynamic signaling overhead.

Similarly, for the users who need to perform the Coordinated Multiple Point (CoMP) transmission, such as the DPS, the TRP transmitting data to the users may be dynamically switched, so the DMRS types (including demodulation reference signal type 1 and demodulation reference signal type 2) need to be the same. Therefore, a method for indicating the DMRS type may include that the base station uses indication information of QLC and the data channel mapping (PQI: PDSCH RE Mapping and Quasi-Co-Location Indicator) to indicate the DMRS type.

Table 4 is a table that the DMRS information indicates DMRS type 2 with one DMRS symbol, as shown in table 4:

TABLE 4

| Indication | Layers | DMRS port (s) | DMRS symbols | Scrambling ID |
|---|---|---|---|---|
| 0 | 1 | p0 | 1 symbol | 0 |
| 1 | 1 | p1 | 1 symbol | 0 |
| 2 | 1 | p2 | 1 symbol | 0 |
| 3 | 1 | p3 | 1 symbol | 0 |
| 4 | 1 | p4 | 1 symbol | 0 |
| 5 | 1 | p5 | 1 symbol | 0 |
| 6 | 2 | p0, p2 | 1 symbol | 0 |
| 7 | 2 | p1, p3 | 1 symbol | 0 |
| 8 | 2 | p4, p5 | 1 symbol | 0 |
| 9 | 3 | p0, p1, p2 | 1 symbol | 0 |
| 10 | 3 | p3, p4, p5 | 1 symbol | 0 |
| 11 | 4 | p0-p3 | 1 symbol | 0 |
| 12 | 5 | p0-p4 | 1 symbol | 0 |
| 13 | 6 | p0-p5 | 1 symbol | 0 |
| 14 | 1 | p0 | 1 symbol | 1 |
| 15 | 1 | p1 | 1 symbol | 1 |
| 16 | 1 | p2 | 1 symbol | 1 |
| 17 | 1 | p3 | 1 symbol | 1 |
| 18 | 1 | p4 | 1 symbol | 1 |
| 19 | 1 | p5 | 1 symbol | 1 |
| 20 | 2 | p0, p2 | 1 symbol | 1 |
| 21 | 2 | p1, p3 | 1 symbol | 1 |
| 22 | 2 | p4, p5 | 1 symbol | 1 |
| 23 | 3 | p0, p1, p2 | 1 symbol | 1 |
| 24 | 3 | p3, p4, p5 | 1 symbol | 1 |
| 25 | 4 | p0-p3 | 1 symbol | 1 |

Table 5 is a table that the DMRS information indicates DMRS type 2 with 2 DMRS symbol, as shown in table 5:

TABLE 5

| Indication | layers | DMRS port (s) | DMRS symbols | Scrambling ID |
|---|---|---|---|---|
| 0 | 1 | p0 | 2 symbols | 0 |
| 1 | 1 | p1 | 2 symbols | 0 |
| 2 | 1 | p2 | 2 symbols | 0 |
| 3 | 1 | p3 | 2 symbols | 0 |
| 4 | 1 | p4 | 2 symbols | 0 |
| 5 | 1 | p5 | 2 symbols | 0 |
| 6 | 1 | p6 | 2 symbols | 0 |
| 7 | 1 | p7 | 2 symbols | 0 |
| 8 | 1 | p8 | 2 symbols | 0 |
| 9 | 1 | p9 | 2 symbols | 0 |
| 10 | 1 | p10 | 2 symbols | 0 |
| 11 | 1 | p11 | 2 symbols | 0 |
| 12 | 2 | p0, p2 | 2 symbols | 0 |
| 13 | 2 | p1, p3 | 2 symbols | 0 |
| 14 | 2 | p6, p8 | 2 symbols | 0 |
| 15 | 2 | p7, p9 | 2 symbols | 0 |
| 16 | 2 | p4, p5 | 2 symbols | 0 |
| 17 | 2 | p10, p11 | 2 symbols | 0 |
| 18 | 3 | p0, p1, p2 | 2 symbols | 0 |
| 19 | 3 | p6, p7, p8 | 2 symbols | 0 |
| 20 | 3 | p3, p4, p5 | 2 symbols | 0 |
| 21 | 3 | p9, p10, p11 | 2 symbols | 0 |
| 22 | 4 | p0-p3 | 2 symbols | 0 |
| 23 | 4 | p6-p9 | 2 symbols | 0 |
| 24 | 4 | p4, p5, p10, p11 | 2 symbols | 0 |
| 25 | 5 | p0, p1, p6, p2, p3 | 2 symbols | 0 |
| 26 | 6 | p0, p1, p6, p2, p3, p8 | 2 symbols | 0 |
| 27 | 7 | p0, p1, p6, p7, p2, p3, p8 | 2 symbols | 0 |
| 28 | 8 | p0, p1, p6, p7, p2, p3, p8, p9 | 2 symbols | 0 |

Table 6 is a table that the DMRS information indicates DMRS type 1 with one DMRS symbol according to example 2, as shown in table 6:

TABLE 6

| Value | layers | DMRS port (s) | DMRS symbols | Scrambling ID |
|---|---|---|---|---|
| 0 | 1 | p0 | 1 symbol | 0 |
| 1 | 1 | p1 | 1 symbol | 0 |
| 2 | 1 | p2 | 1 symbol | 0 |
| 3 | 1 | p3 | 1 symbol | 0 |
| 4 | 2 | p0, p1 | 1 symbol | 0 |
| 5 | 2 | p2, p3 | 1 symbol | 0 |
| 6 | 2 | p0, p2 | 1 symbol | 0 |
| 7 | 2 | p1, p3 | 1 symbol | 0 |
| 8 | 3 | p0, p1, p2 | 1 symbol | 0 |
| 9 | 4 | p0-p3 | 1 symbol | 0 |
| 10 | 1 | p0 | 1 symbol | 1 |
| 11 | 1 | p1 | 1 symbol | 1 |
| 12 | 1 | p2 | 1 symbol | 1 |
| 13 | 1 | p3 | 1 symbol | 1 |
| 14 | 2 | p0, p1 | 1 symbol | 1 |
| 15 | 2 | p2, p3 | 1 symbol | 1 |
| 16 | 2 | p0, p2 | 1 symbol | 1 |
| 17 | 2 | p1, p3 | 1 symbol | 1 |
| 18 | 3 | p0, p1, p2 | 1 symbol | 1 |
| 19 | 4 | p0-p3 | 1 symbol | 1 |

Table 7 is a table that the DMRS information indicates DMRS type 1 with two DMRS symbol, as shown in table 7:

TABLE 7

| Indication | layers | DMRS port (s) | DMRS symbols | Scrambling ID |
|---|---|---|---|---|
| 0 | 1 | p0 | 2 symbols | 0 |
| 1 | 1 | p1 | 2 symbols | 0 |
| 2 | 1 | p2 | 2 symbols | 0 |
| 3 | 1 | p3 | 2 symbols | 0 |
| 4 | 1 | p4 | 2 symbols | 0 |
| 5 | 1 | p5 | 2 symbols | 0 |
| 6 | 1 | p6 | 2 symbols | 0 |
| 7 | 1 | p7 | 2 symbols | 0 |
| 8 | 2 | p0, p1 | 2 symbols | 0 |
| 9 | 2 | p2, p3 | 2 symbols | 0 |
| 10 | 2 | p4, p5 | 2 symbols | 0 |
| 11 | 2 | p6, p7 | 2 symbols | 0 |
| 12 | 3 | p0, p2, p4 | 2 symbols | 0 |
| 13 | 3 | p1, p3, p5 | 2 symbols | 0 |
| 14 | 3 | p0, p4, p1 | 2 symbols | 0 |
| 15 | 4 | p0, p2, p4, p6 | 2 symbols | 0 |
| 16 | 4 | p1, p3, p5, p7 | 2 symbols | 0 |
| 17 | 4 | p0, p4, p1, p5 | 2 symbols | 0 |
| 18 | 5 | p0, p2, p4, p1, p3 | 2 symbols | 0 |
| 19 | 6 | p0, p2, p4, p1, p3, p5 | 2 symbols | 0 |
| 20 | 7 | p0, p2, p4, p6, p1, p3 | 2 symbols | 0 |
| 21 | 8 | p0-p7 | 2 symbols | 0 |
| 22 | 1 | p0 | 2 symbols | 1 |
| 23 | 1 | p1 | 2 symbols | 1 |
| 24 | 1 | p2 | 2 symbols | 1 |
| 25 | 1 | p3 | 2 symbols | 1 |
| 26 | 1 | p4 | 2 symbols | 1 |
| 27 | 1 | p5 | 2 symbols | 1 |
| 28 | 1 | p6 | 2 symbols | 1 |
| 29 | 1 | p7 | 2 symbols | 1 |
| 30 | 2 | p0, p1 | 2 symbols | 1 |
| 31 | 2 | p2, p3 | 2 symbols | 1 |

As described above, different DMRS types or different DMRS symbol quantities correspond to different DMRS information tables, that is, the PQI indication information is used to indicate the type of table for indicating the DMRS information. Multiple tables for indicating the DMRS information are predefined or configured with the higher layer signaling, as shown in tables 4-7. The table type indicated by the PQI is not necessarily limited to different DMRS types or different DMRS symbol quantities. So, even if the DMRS type and DMRS symbol quantity have been semi-statically configured by higher layer signaling, the physical layer dynamic signaling is not used for selection, the use of this method is not affected.

The first communication node indicates the quasi-colocation configuration information and port mapping information of the demodulation reference signal through the joint signaling. In this way, the port mapping refers to the table of DMRS information.

If the two DMRS port groups indicated by the PQI are quasi co-located with respect to only a part of QCL parameters rather than all of the QCL parameters, the indication bits of the allocated two ports include p0 and p2, or p2 and p3. Table 8a is a table that the DMRS information according to example 2 indicates DMRS type 2 with one DMRS symbol. As shown in Table 8a, two DMRS ports should belong to two DMRS port groups or two CDM groups to ensure the QCL of DMRS ports in the same CDM group is the same. If the two DMRS port groups indicated by the PQI are quasi co-located with respect to all QCL parameters, the indicator bits of the allocated two ports include p0 and p1, or p2 and p3, or p4 and p5. Table 8b is a table that the DMRS information according to example 2 indicates DMRS type 2 with one DMRS symbol.

According to whether the two DMRS port groups are quasi co-located with respect to all QCL parameters, the tables for indicating the DMRS information may be divided into multiple categories to reduce bits of the indication status of the DMRS table, thereby reducing the DCI overhead.

In other words, the base station uses joint indication information to notify the user of the indication information of PQI, and may also indicate the DMRS port mapping information even when only one DMRS information table is provided in this case, such as table 8a. For indication i, if the PQI parameter subsets 2-1, 2-2 received by the UE are the same, the port indication bit i represents p0 and p1, otherwise the port indication bit i is p0 and p2. That is to say, a DMRS port mapping relationship indicated by the indication bit is related to the indication information of PQI.

Since the QCL information indicated by the PQI is different, the DMRS port mapping is changed, the mapping from the PTRS to the DMRS port is also changed.

TABLE 8a

| Indication | layers | DMRS port (s) | DMRS symbols | Scrambling ID | PTRS port |
|---|---|---|---|---|---|
| . . . | . . . | . . . | 1 symbol | . . . | |
| i | 2 | p0, p2 | 1 symbol | 0 | m0, m1 |
| i + 1 | 2 | p1, p3 | 1 symbol | 0 | m0, m1 |
| . . . | . . . | . . . | . . . | . . . | |
| . . . | . . . | . . . | . . . | . . . | |

TABLE 8b

| Indication | layers | DMRS port (s) | DMRS symbols | Scrambling ID | PTRS port |
|---|---|---|---|---|---|
| . . . | . . . | . . . | 1 symbol | . . . | |
| i | 2 | p0, p1 | 1 symbol | 0 | m0 |
| i + 1 | 2 | p2, p3 | 1 symbol | 0 | m0 |
| i + 2 | 2 | p4, p5 | 1 symbol | 0 | m0 |
| . . . | . . . | . . . | . . . | . . . | |

Example 3

Different port orders correspond to different QCL relationships.

To save the PQI indication information, that is, to reduce the number of PQI sets configured by the higher layer as much as possible, the base station implicitly indicates the QCL information of different DMRS port groups by the order of DMRS port mapping.

```
The first set of PQI parameters
{
parameter subset 1, which is used for the data channel mapping or the
rate matching
parameter subset 2-1 which indicates the reference signal configuration
ID#0 and estimates relevant QCL parameters
parameter sub set 2-2 which indicates the reference signal configuration
ID#1 and estimates relevant QLC parameters
}
The second set of PQI parameters
{
parameter sub set 1, which is used for the data channel mapping or the
rate matching
parameter sub set 2-1, which indicates the reference signal configuration
ID#0 and estimates relevant QCL parameters
parameter subset 2-2, which indicates the reference signal configuration
ID#1 and estimates relevant QCL parameters
}
```

As described above, to save the DCI overhead, it is assumed that the higher layer signaling only configures 2 sets of PQI parameters for the user. The first set of PQI parameters means a single-point transmission since the reference signal configuration ID of the parameter subset 2-1 and the reference signal configuration ID of the parameter subset 2-2 are the same. The second set of PQI parameters indicates the multi-TRP transmission. The two DMRS port groups corresponding to the parameter subsets 2-1 and 2-2 are not quasi co-located. Only 1 bit DCI overhead is required to notify the user whether is the first set of PQI parameters or the second set of PQI parameters. However, during the multi-TRP transmission, the scheduling is limited. For example, for a user with 5 layers, as shown in table 1, when the indication is 12, the number of DMRS ports allocated to one user is five, which are ports p0, p1, p2, p3, and p4 respectively. The DMRS port group#0 includes ports p0 and p1 by fault, corresponding to PQI parameter subset 2-1. The DMRS port group#1 includes ports p2, p3 and p4, corresponding to PQI parameter subset 2-2. That is to say, the TRP corresponding to PQI parameter subset 2-1 is transmission layer 2 by default rather than layer 3. To support the flexible scheduling, one option may be added to the indication bits of the DMRS information. That is, for the five DMRS ports p2, p3, p4, p0 and p1, compared with the p0, p1, p2, p3 and p4 included in the indication bits, the included DMRS ports are not changed, but the order is changed. In this case, p2, p3 and p4 correspond to the PQI parameter subset 2-1 by default, and port p0 and p1 correspond to the PQI parameter subset 2-2.

To achieve flexibility, a method for indicating the different orders of DMRS ports includes that multiple defined DMRS information indicator bits include the same DMRS ports, and the multiple indicator bits indicate different orders of DMRS ports. DMRS ports in different orders correspond to different QCL parameters. Table 9 is a table that the DMRS information indicates DMRS type 2 with one DMRS symbol. As shown in layer 3 in table 9:

TABLE 9

| Indication | layers | DMRS port (s) | DMRS symbols | Scrambling ID |
|---|---|---|---|---|
| 0 | 1 | p0 | 1 symbol | 0 |
| 1 | 1 | p1 | 1 symbol | 0 |
| 2 | 1 | p2 | 1 symbol | 0 |
| 3 | 1 | p3 | 1 symbol | 0 |
| 4 | 1 | p4 | 1 symbol | 0 |
| 5 | 1 | p5 | 1 symbol | 0 |
| 6 | 2 | p0, p2 | 1 symbol | 0 |
| 7 | 2 | p1, p3 | 1 symbol | 0 |
| 8 | 2 | p4, p5 | 1 symbol | 0 |
| 9 | 3 | p0, p1, p2 | 1 symbol | 0 |
| 10 | 3 | p2, p0, p1 | 1 symbol | 0 |
| 11 | 3 | p3, p4, p5 | 1 symbol | 0 |
| 12 | 3 | p4, p5, p3 | 1 symbol | 0 |

For example, if the maximum number of DMRS groups configured by the base station for the user exceeds one, the indication of some DMRS ports may have some problems. For example, one DMRS symbol is used and the transmission of one user UE#0 has 6 layers, that is, the number of DMRS ports configured for the user is 6, and the PQI parameter set includes parameter subsets 2-1 and 2-2. If the QCL parameter information indicated by subset 2-1 and the QCL parameter information indicated by subset 2-2 are different, then problems may occur. It is assumed that each DMRS port group contains the same number of DMRS ports, that is, each DMRS port group contains 3DMRS ports. In this case, one CDM group contains two DMRS ports from different DMRS groups, which does not conform to the previously predefined rule. The rule is that the DMRS ports in the same CDM group must have the same QCL parameters. As shown in FIG. 3, for example, the port group #0 includes ports p0, p1 and p2. the port group #1 includes ports p3, p4 and p5. If QCL parameters in the two port groups are different, that is, the QCL parameters in the port p2 and the QCL parameters in port p3 are different, since the port p2 and the port p3 are in one CDM group, and the DLRS port in one CDM group should have the same QCL parameters, then the contradiction occurs.

To avoid this case, if one user configures six DMRS ports and the six DMRS ports are mapped onto only one DMRS symbol, QCLs of all predefined DMRS ports only use information of the QCL parameter subset 2-1 or only use information of the QCL parameter subset 2-2. In other words, if one user is configured with QCL information of 2 port groups, and the user is configured with 6 DMRS ports which are mapped onto one DMRS symbol, then all predefined DMRS ports use the QCL information configured by the port group #0 or all predefined DMRS ports use the QCL information configured by the port group #1. More simply, if one user is configured with QCL information of the two port groups, and the user is configured with six DMRS ports which are mapped onto one DMRS symbol, then all predefined DMRS ports only use QCL information corresponding to port group #0 and do not use the QCL information corresponding to port group #1.

As an extension, if one user is configured with the QCL configuration information of multiple DMRS port groups, and some ports in the multiple port groups allocated to the user are from the same CDM group. In this case, all the predefined DMRS ports only use the QCL information corresponding to one of the DMRS port groups. Or more directly, if one user is configured with QCL configuration information of multiple DMRS port groups, and some ports in the multiple port groups allocated to the user are from the same CDM group, in this case, all predefined DMRS ports only use the QCL information corresponding to the first one of the multiple DMRS port groups. For example, the UE#0 is configured with the QCL information of the two DMRS groups, and the DMRS ports configured by the base station for the user are ports p0, and p1. The ports p0 and p1 are from the same CDM group, in this case, the predefined ports p0 and p1 only use the QCL parameter information configured in the parameter subset 2-1 and do not use the QCL parameter information configured in parameter subset 2-2.

From the description of the embodiment described above, it will be apparent to those skilled in the art that the method in the embodiment described above may be implemented by software plus a necessary general-purpose hardware platform, or may of course be implemented by hardware, but in many cases, the former is a preferred implementation mode. Based on this understanding, the solution provided by the present application substantially, or the part sharing with the related art, may be embodied in the form of a software product. The software product is stored on a storage medium (such as a ROM/RAM, a magnetic disk or an optical disk) and includes several instructions for enabling a terminal device (which may be a mobile phone, a computer, a server or a network device) to execute the method according to each embodiment of the present application.

Figure 9:
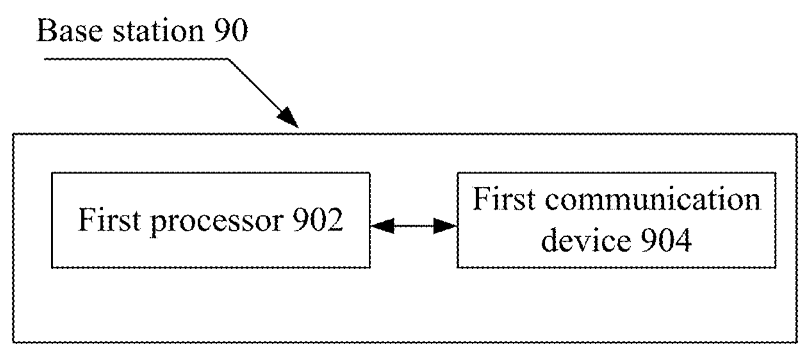
FIG. 9 is a diagram illustrating the hardware construction of a base station according to an embodiment of the present application.

A base station is provided by another embodiment of the present application. FIG. 9 is a diagram illustrating the hardware construction of the base station according to an embodiment of the present application. As shown in FIG. 9, the base station 90 includes:

a first processor 902, which is configured to determine joint signaling, where the joint signaling includes first information and second information, the first information includes at least one of: quasi-colocation configuration information and configuration information of a transmission beam; the second information includes at least one of the following: phase tracking reference signal configuration information and configuration information of a demodulation reference signal; and a first communication device 904, which is configured to transmit the joint signaling to a second communication node.

What needs to be supplemented is that the example methods which may be executed by a first communication node in the method embodiments may be executed by the base station 90 in this embodiment.

Figure 10:
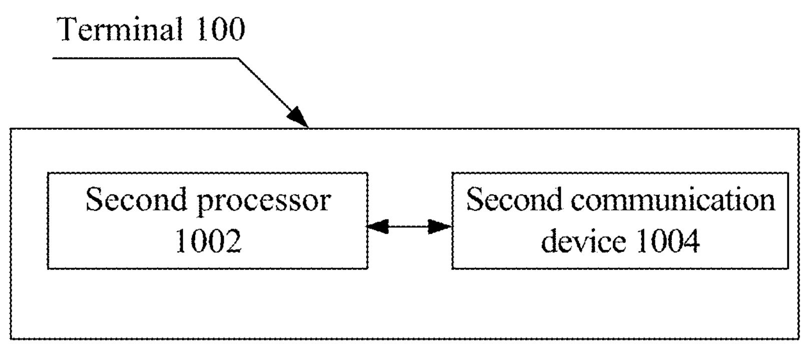
FIG. 10 is a diagram illustrating the hardware construction of a terminal according to an embodiment of the present application.

A terminal is provided by another embodiment of the present application. FIG. 10 is a diagram illustrating the hardware construction of the terminal according to an embodiment of the present application. As shown in FIG. 10, the terminal 100 includes:

a second communication device 1004, which is configured to receive joint signaling transmitted by a first communication node, where the joint signaling includes first information and second information, the first information includes at least one of: quasi-colocation configuration information and configuration information of a transmission beam, and the second information includes at least one of: configuration information of a phase tracking reference signal and configuration information of a demodulation reference signal; and a second processor 1002, which is configured to receive, according to the joint signaling, data transmitted by the first communication node, and/or perform data transmission with the first communication node.

What needs to be supplemented is that example methods executed by the second communication node in the method embodiments may be executed by the terminal 100 in this embodiment.

What needs to be supplemented is that the terminal 100 may be a mobile terminal in FIG. 1

A device for indicating reference signal information is provided by another embodiment of the present application, applied to the first communication node, including:

a determining module, which is configured to determine joint signaling, where the joint signaling includes first information and second information, the first information includes at least one of: quasi-colocation configuration information and configuration information of a transmission beam, the second information includes at least one of: configuration information of a phase tracking reference signal and configuration information of a demodulation reference signal; and a transmitting module, which is configured to transmit the joint signaling to the second communication node.

What needs to be supplemented is that in the steps in the methods executed by the first communication node in the method embodiments may be executed by the above virtual device.

A device for indicating reference signal information is provided by another embodiment of the present application, applied to the second communication node, including:

a receiving module, which is configured to receive joint signaling transmitted by the first communication node, where the joint signaling includes first information and second information, the first information includes at least one of: quasi-colocation configuration information and configuration information of a transmission beam, the second information includes at least one of: configuration information of a phase tracking reference signal and configuration information of a demodulation reference signal; and a transmission module, which is configured to receive, according to the joint signaling, data transmitted by the first communication node, and/or perform data transmission with the first communication node.

What needs to be supplemented is that the steps in the methods executed by the second communication node in the method embodiments may be executed by the above virtual device.

It should be noted that the abovementioned modules may be implemented by software or hardware, and the latter may be realized by, but not limited to, the following form: the abovementioned modules are located in the same processor, or the abovementioned modules are located in different processors, respectively.

A system embodiment is further provided in this embodiment, which may include the first communication node and the second communication node in the above embodiment, as well as the steps in the methods executed by the first communication node and the second communication node.

A processor is provided by another embodiment of the present application. The processor is used for executing programs. When executed, the programs execute the method of any one of the embodiments described above.

A storage medium is provided by another embodiment of the present application. The storage medium stores programs. When executed, the programs execute the method of any one of the embodiments described above.

Apparently, those skilled in the art should know that each of the above-mentioned modules or steps of the present application may be implemented by a general-purpose computing device, the modules or steps may be concentrated on a single computing device or distributed on a network formed by multiple computing devices, and in some embodiments, the modules or steps may be implemented by program codes executable by the computing devices, so that modules or steps may be stored in a storage device and executed by the computing devices. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any specific combination of hardware and software.

The above are only examples of the present application and are not intended to limit the present application, and for those skilled in the art, the present application may have various modifications and variations. Any modifications, equivalent substitutions, improvements and the like made within the spirit and principle of the present application should fall within the scope of the present application.

Apparently, those skilled in the art should understand that the above-mentioned modules or steps of the present disclosure may be implemented by a general-purpose computing device, the modules or steps may be integrated on a single computing device or distributed on a network formed by multiple computing devices, and alternatively, the modules or steps may be implemented by program codes executable by the computing devices, so that modules or steps may be stored in a storage device and executed by the computing devices. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any specific combination of hardware and software.

The above are embodiments of the present application and are not intended to limit the present application, and for those skilled in the art, the present application may have various modifications and variations. Any modifications, equivalent substitutions, improvements and the like made within the spirit and principle of the present application fall within the scope of the present application.

The invention claimed is:

1. A method for wireless communication, comprising:

notifying a first communication node of a second information by transmitting, by a second communication node, a signaling of first information to the first communication node, wherein the first information comprises quasi-colocation configuration information, the quasi-colocation configuration information comprising one or more quasi-colocation parameter subsets, wherein ports of a demodulation reference signal are divided into one or more port groups of the demodulation reference signal, and wherein each of the one or more quasi-colocation parameter subsets corresponds to a port group of the demodulation reference signal, wherein the second information comprises a number of ports of a phase tracking reference signal, port identifiers of the phase tracking reference signal, or port mapping information of the demodulation reference signal; and performing, by the second communication node, a data transmission with the first communication node based on the second information.

2. The method of claim 1, wherein the signaling of the first information comprises port identifiers of a phase tracking reference signal corresponding to each of the one or more quasi-colocation parameter subsets.

3. The method of claim 1, wherein a maximum number of ports of the phase tracking reference signal is equal to a maximum number of quasi-colocation parameter subsets.

4. The method of claim 1, wherein the signaling of the first information further indicates whether the one or more port groups of the demodulation reference signal share one phase tracking reference signal.

5. A method for wireless communication, comprising:

determining, by a first communication node, a second information by receiving a signaling of first information from a second communication node, wherein the first information comprises quasi-colocation configuration information, wherein the quasi-colocation configuration information comprises one or more quasi-colocation parameter subsets, wherein ports of a demodulation reference signal are divided into one or more port groups of the demodulation reference signal, and wherein each of the one or more quasi-colocation parameter subsets corresponds to a port group of the demodulation reference signal; and wherein the second information comprises a number of ports of a phase tracking reference signal, port identifiers of the phase tracking reference signal, or port mapping information of the demodulation reference signal; and performing, by the first communication node according to the second information, data transmission with the second communication node that transmits the signaling of the first information.

6. The method of claim 5, wherein the signaling of the first information comprises port identifiers of one phase tracking reference signal corresponding to each of the one or more quasi-colocation parameter subsets.

7. The method of claim 5, wherein a maximum number of ports of the phase tracking reference signal is equal to a maximum number of quasi-colocation parameter subsets.

8. The method of claim 5, wherein the signaling of the first information further indicates whether the one or more port groups of the demodulation reference signal share one phase tracking reference signal.

9. A base station, comprising:

a processor; and a memory including processor executable code, wherein the processor executable code upon execution by the processor configures the processor to:

notify second information by transmitting a signaling of first information to a terminal, wherein the first information comprises quasi-colocation configuration information, the quasi-colocation configuration information comprising one or more quasi-colocation parameter subsets, wherein ports of a demodulation reference signal are divided into one or more port groups of the demodulation reference signal, and wherein each of the one or more quasi-colocation parameter subsets corresponds to a port group of the demodulation reference signal, wherein the second information comprises a number of ports of a phase tracking reference signal, port identifiers of the phase tracking reference signal, or port mapping information of the demodulation reference signal; and performing a data transmission with the terminal based on the second information.

10. The base station of claim 9, wherein the signaling of the first information comprises port identifiers of a phase tracking reference signal corresponding to each of the one or more quasi-colocation parameter subsets.

11. The base station of claim 9, wherein a maximum number of ports of the phase tracking reference signal is equal to a maximum number of quasi-colocation parameter sub sets.

12. The base station of claim 9, wherein the signaling of the first information further indicates whether the one or more port groups of the demodulation reference signal share one phase tracking reference signal.

13. A terminal, comprising:

a processor; and a memory including processor executable code, wherein the processor executable code upon execution by the processor configures the processor to:

determine second information by receiving a signaling of first information, wherein the first information comprises quasi-colocation configuration information, wherein the quasi-colocation configuration information comprises one or more quasi-colocation parameter subsets, wherein ports of a demodulation reference signal are divided into one or more port groups of the demodulation reference signal, and wherein each of the one or more quasi-colocation parameter subsets corresponds to a port group of the demodulation reference signal; and wherein the second information comprises a number of ports of a phase tracking reference signal, port identifiers of the phase tracking reference signal, or port mapping information of the demodulation reference signal; and perform, according to the second information, data transmission with a base station that transmits the signaling of the first information.

14. The terminal of claim 13, wherein the signaling of the first information comprises port identifiers of a phase tracking reference signal corresponding to each of the one or more quasi-colocation parameter subsets.

15. The terminal of claim 13, wherein a maximum number of ports of the phase tracking reference signal is equal to a maximum number of quasi-colocation parameter sub sets.

16. The terminal of claim 13, wherein the signaling of the first information further indicates whether the one or more port groups of the demodulation reference signal share one phase tracking reference signal.

* * * * *